(12) United States Patent
Choi et al.

(10) Patent No.: US 11,350,178 B2
(45) Date of Patent: May 31, 2022

(54) CONTENT PROVIDING SERVER, CONTENT PROVIDING TERMINAL AND CONTENT PROVIDING METHOD

(71) Applicant: NAVER Corporation, Seongnam-si (KR)

(72) Inventors: Byung Gyou Choi, Seongnam-si (KR); Jun Oh Kim, Seongnam-si (KR); Song Hyun Park, Seongnam-si (KR); Chan Su Suh, Seongnam-si (KR); Han Na Son, Seongnam-si (KR); Sang Yoon Lee, Seongnam-si (KR); Sung Hyun Lee, Seongnam-si (KR); Taek Joo Chung, Seongnam-si (KR); You Hwan Choi, Seongnam-si (KR); Hyo Won Hwang, Seongnam-si (KR); Jun Yoon, Seongnam-si (KR); Chan Hyuk Ko, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 341 days.

(21) Appl. No.: 16/409,029

(22) Filed: May 10, 2019

(65) Prior Publication Data
US 2019/0349641 A1 Nov. 14, 2019

(30) Foreign Application Priority Data
May 10, 2018 (KR) ........................ 10-2018-0053643

(51) Int. Cl.
H04N 21/488 (2011.01)
G10L 15/05 (2013.01)
(Continued)

(52) U.S. Cl.
CPC ...... *H04N 21/4884* (2013.01); *G06F 16/7834* (2019.01); *G06V 20/46* (2022.01); *G10L 15/02* (2013.01); *G10L 15/05* (2013.01)

(58) Field of Classification Search
CPC ............ H04N 21/4884; G06F 16/7834; G06K 9/00744; G01L 15/05; G01L 15/02
See application file for complete search history.

(56) References Cited

U.S. PATENT DOCUMENTS

2003/0200091 A1 10/2003 Furuyama et al.
2011/0134321 A1* 6/2011 Berry .................. G11B 27/322
348/464
(Continued)

FOREIGN PATENT DOCUMENTS

JP 2000236494 A 8/2000
JP 2002335473 A 11/2002
(Continued)

OTHER PUBLICATIONS

U.S. Appl. No. 16/002,856, filed Jun. 7, 2018.
(Continued)

*Primary Examiner* — Oschta I Montoya
(74) *Attorney, Agent, or Firm* — Greer Burns & Crain Ltd.

(57) ABSTRACT

Disclosed is a scene meta information generating apparatus including: a subtitle information generating unit configured to detect a plurality of unit subtitles based on a subtitle file related to image contents and correct the plurality of unit subtitles; an audio information generating unit configured to extract audio information from the image contents, detect a plurality of speech segments based on the audio information, and perform speech-recognition on audio information in each speech segment; and an image information generating unit configured to detect a video segment corresponding to each speech segment, perform image-recognition on image
(Continued)

frames in the video segment, and selecting a representative image from the image frames.

20 Claims, 18 Drawing Sheets

(51) Int. Cl.
*G06F 16/783* (2019.01)
*G10L 15/02* (2006.01)
*G06V 20/40* (2022.01)

(56) References Cited

U.S. PATENT DOCUMENTS

| | | | | |
|---|---|---|---|---|
| 2014/0037216 | A1* | 2/2014 | Kumar | G06K 9/6249 |
| | | | | 382/197 |
| 2016/0295132 | A1* | 10/2016 | Burgess | G11B 27/10 |
| 2016/0300565 | A1* | 10/2016 | Arrowood | G10L 15/08 |
| 2017/0182415 | A1* | 6/2017 | Fukuda | A63F 13/35 |
| 2017/0206929 | A1 | 7/2017 | Jo et al. | |
| 2019/0104259 | A1* | 4/2019 | Angquist | G11B 27/036 |

FOREIGN PATENT DOCUMENTS

| | | |
|---|---|---|
| JP | 2008148121 A | 6/2008 |
| JP | 2010233019 A | 10/2010 |
| JP | 2017005442 A | 1/2017 |
| KR | 1020150022088 A | 3/2015 |
| KR | 1020160044981 A | 4/2016 |

OTHER PUBLICATIONS

Notice of Allowance issued in corresponding Japanese application No. JP2019-89618, dated Jul. 21, 2020.

Office action issued in corresponding Korean patent application No. 10-2018-0053643, dated Jul. 8, 2019.

\* cited by examiner

FIG. 8

| ID (810) | TIME CODE (820) | REPRESENTATIVE IMAGE (830) | SPEECH (840) | SUBTITLE (850) | IMAGE TAG (860) |
|---|---|---|---|---|---|

<CONFIGURATION OF SCENE META INFORMATION FRAME>

<OPERATION PROCESS OF SPEECH RECOGNIZING UNIT>

<OPERATION PROCESS OF IMAGE TAGGING UNIT>

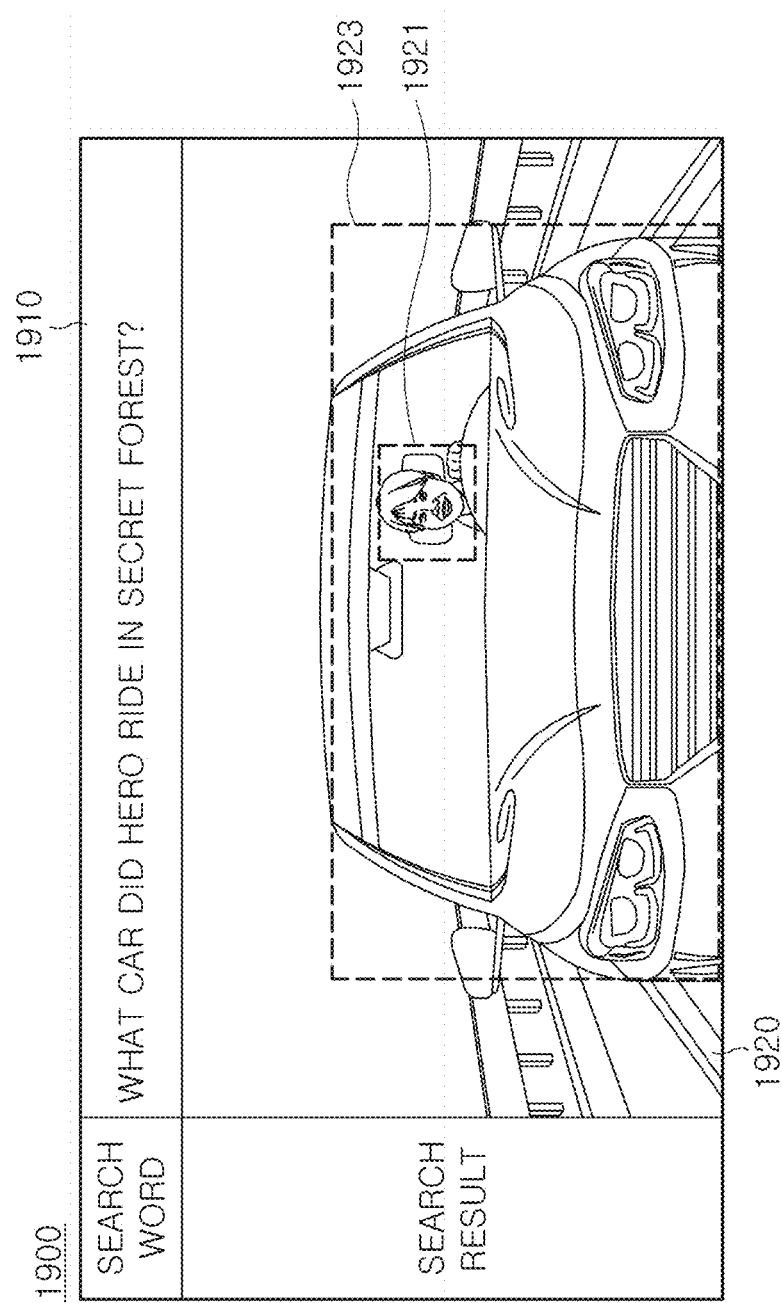

CONTENT PROVIDING SERVER, CONTENT PROVIDING TERMINAL AND CONTENT PROVIDING METHOD

CROSS-REFERENCE TO RELATED APPLICATIONS

This application claims priority to Korean Patent Application No. 10-2018-0053643 filed on May 10, 2018 in the Korean Intellectual Property Office, the entire contents of which are hereby incorporated by reference in their entirety.

BACKGROUND OF THE INVENTION

Field of Invention

The present invention relates to a content providing server, a content providing terminal, and a content providing method, and more particularly, to a content providing server, a content providing terminal, and a content providing method for generating scene meta information for each playback segment using audio information extracted from image contents.

Description of Related Art

With the development of information and communication technology and culture, various image contents are being produced and spreading all over the world. However, in regard to image contents, unlike a book, since viewers cannot control the progress level of contents, the viewers must view, regardless of viewers' understanding an image which is being reproduced, the corresponding image. Therefore, in order to solve this problem, various methods for controlling a playback time of an image or searching an image are presented.

As a method that can be most representatively presented in order to control the playback time of an image, a control using a scroll bar may be exemplified. This is a scheme in which, when a user selects an arbitrary point in a scroll region generated in response to the playback time of an image, the playback time of the image is shifted to the corresponding time.

However, since the scroll region has a predetermined length irrespective of the playback time of the image, when the playback time of the image is long, the playback time of the image is largely changed even with a small shift in the scroll region, and as a result, it become difficult to minutely control the playback time.

In particular, when an image is viewed in a mobile environment, there are many cases in which the size of a display is small and the scroll bar needs to be controlled with a finger, and as a result, it is more difficult to control the playback time of the image.

In the case of an image, there are many cases in which lines of characters or subtitles for describing reproduced contents are appended and provided in order to facilitate the understanding of the user. However, when the user uses a scrolling function to find the subtitles of specific contents from the image, it is not easy to find subtitles for a desired scene and line due to the above problem.

When the user wants to grasp the contents of the image in an environment where a communication speed of the user is limited, the image can not be smoothly provided from a server to a content providing terminal when the image has a large capacity or high image quality, and as a result, it may be difficult to view all scenes of the image in real time.

BRIEF SUMMARY OF THE INVENTION

The present invention has been made in an effort to solve the above-described problems and other problems. The present invention has also been made in an effort to provide a content providing server, a content providing terminal, and a content providing method for generating scene meta information for each playback segment using audio information extracted from image contents.

The present invention has also been made in an effort to provide a content providing server, a content providing terminal, and a content providing method for providing various video services using scene meta information for each playback segment for image contents.

In order to achieve the object, an exemplary embodiment of the present invention provides a scene meta information generating apparatus including: a subtitle information generating unit configured to detect a plurality of unit subtitles based on a subtitle file related to image contents and correct the plurality of unit subtitles; an audio information generating unit configured to extract audio information from the image contents, detect a plurality of speech segments based on the audio information, and perform speech-recognition on audio information in each speech segment; and an image information generating unit configured to detect a video segment corresponding to each speech segment, perform image-recognition on image frames in the video segment, and select a representative image from the image frames.

Another exemplary embodiment of the present invention provides a scene meta information generating method including: detecting subtitle information based on a subtitle file related to image contents; extracting audio information from the image contents and detecting a plurality of speech segments based on the audio information; correcting the subtitle information based on a speech recognition result on audio information in each speech segment; and detecting a video segment corresponding to each speech segment and selecting a representative image based on an image recognition result on image frames in the video segment.

Yet another exemplary embodiment of the present invention provides a scene meta information generating apparatus including: an audio information generating unit configured to extract audio information from image contents, detect a plurality of speech segments based on the audio information, and perform speech-recognition on audio information in each speech segment; a subtitle information generating unit configured to generate subtitle information based on a speech recognition result on the audio information in each speech segment; and an image information generating unit configured to detect a video segment corresponding to each speech segment, perform image-recognition on image frames in the video segment, and selecting a representative image from the image frames.

BRIEF DESCRIPTION OF THE DRAWINGS

FIG. 8 is a diagram illustrating a configuration of a scene meta information frame according to an exemplary embodiment of the present invention.

FIG. 19 is a diagram illustrating a user terminal providing a video search service using scene meta information.

DETAILED DESCRIPTION OF THE INVENTION

Figure 1:
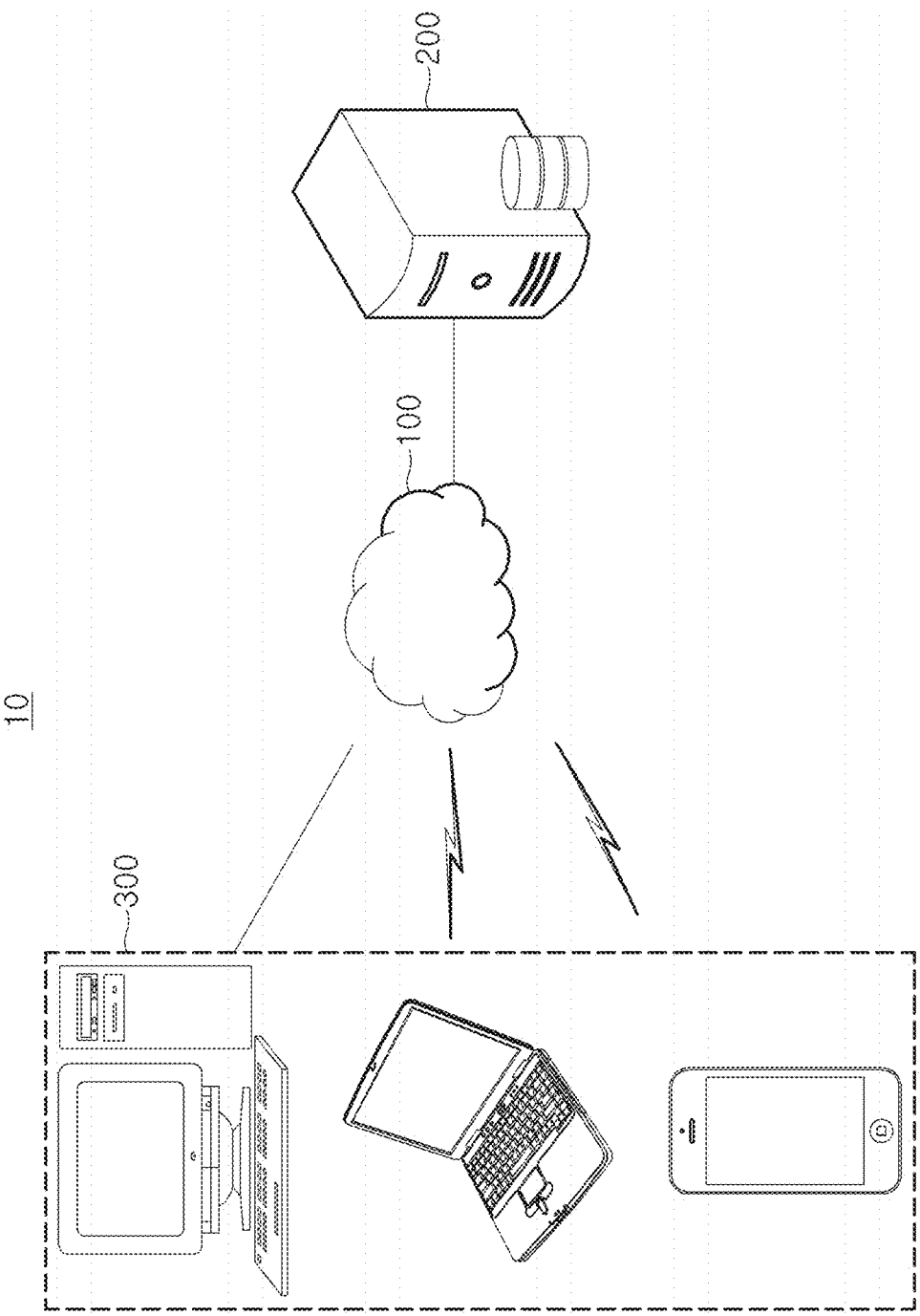
FIG. 1 is a diagram illustrating a configuration of a content providing system according to an exemplary embodiment of the present invention.

Hereinafter, exemplary embodiments disclosed in this specification will be described in detail with reference to the accompanying drawings and the same or similar components are denoted by the same reference numerals regardless of a sign of the drawing, and duplicated description thereof will be omitted. Suffixes "module" and "unit" for components used in the following description are given or mixed in consideration of easy preparation of the specification only and do not have their own distinguished meanings or roles. Further, the term "unit" used in the present invention means software and hardware components such as FPGA or ASIC and the "unit" performs predetermined roles. However, the "unit" is not a meaning limited to software or hardware. The "unit" may be configured to reside on an addressable storage medium and may be configured to play back one or more processors. Accordingly, as one example, the "unit" includes components such as software components, object oriented software components, class components, and task components, processes, functions, attributes, procedures, subroutines, segments of a program code, drivers, firmware, microcode, circuitry, data, databases, data structures, tables, arrays, and variables. Functions provided in the components and the "units" may be combined into a smaller number of components and "units" or further separated into additional components and "units".

In describing the exemplary embodiment of this specification, a detailed description of related known technologies will be omitted if it is determined that the detailed description makes the gist of the exemplary embodiment disclosed in this specification unclear. Further, it is to be understood that the accompanying drawings are just used for easily understanding the exemplary embodiments disclosed in this specification and a technical spirit disclosed in this specification is not limited by the accompanying drawings and all changes, equivalents, or substitutes included in the spirit and the technical scope of the present invention are included.

The present invention proposes a content providing server, a content providing terminal, and a content providing method for generating scene meta information for each playback segment using audio information extracted from image contents. Further, the present invention proposes a content providing server, a content providing terminal, and a content providing method for providing various video services using scene meta information for each playback segment for image contents.

In this specification, the image contents as contents reproduced by a display device of a user terminal means a moving image constituted by multiple images and audio frames. A subtitle file (e.g., smi file) is a file related to the subtitle associated with the image contents, and may be included and provided in the image contents or separately from the image contents. The subtitle file may be produced by an image content provider or a separate subtitle provider and stored in a database.

The scene meta information is information for identifying scenes constituting the image contents and includes at least one of a time code, representative image information, subtitle information, and audio information. Here, the time code is information on a subtitle segment and/or a speech segment of the image contents and the representative image information is information on any one of scene images in the speech segment. Further, the subtitle information is unit subtitle information corresponding to each subtitle segment and the audio information is unit audio information corresponding to each speech segment.

The speech segment as information on a segment in which a unit speech is output among playback segments of the image contents may be constituted by 'speech start time information' on the playback time of the image contents in which the output of each unit speech starts, 'speech end time information' on the production time of the image contents in which the output of each unit speech ends, and 'speech output time information' on a time when the output of each unit speech is maintained. As another exemplary embodiment, the speech segment may be constituted only by the 'speech start time information' and the 'speech end time information'.

The subtitle segment as information on a segment in which a unit subtitle is displayed among the playback segments of the image contents may be constituted by 'subtitle start time information' on the playback time of the image contents in which the display of each unit subtitle starts, 'subtitle end time information' on the production time of the image contents in which the display of each unit subtitle ends, and 'subtitle display time information' on a time when the display of each unit subtitle is maintained. As another exemplary embodiment, the subtitle segment may be constituted by only the 'subtitle start time information' and the 'subtitle end time information'.

As described above, the speech segment and the subtitle segment may be set based on the playback time of the image contents. On the other hand, the subtitle segment may be arbitrarily set by a subtitle maker or editor. The subtitle segment is not set only for a segment in which lines or narration is output in the image contents. Therefore, the maker or editor of the subtitle information may set an arbitrary segment of the image contents as the subtitle segment.

Hereinafter, various exemplary embodiments of the present invention will be described in detail with reference to drawings.

FIG. 1 is a diagram illustrating a configuration of a content providing system according to an exemplary embodiment of the present invention.

Referring to FIG. 1, a content providing system 10 according to the present invention may include a communication network 100, a server 200, and a user terminal 300.

The server 200 and the user terminal 300 may be connected to each other through the communication network 100. The communication network 100 may include a wired network and a wireless network and in detail, may include various networks including a local area network (LAN), a metropolitan area network (MAN), a wide area network (WAN), and the like. Further, the communication network 100 may include the known world wide web (WWW). However, the communication network 100 according to the present invention is not limited to the enumerated networks and may include at least one of a known wireless data network, a known telephone network, and a known wired/wireless television network.

The server 200 as a service providing server or a content providing server may perform a function to provide a communication service requested by the user terminal 300. As an example, when the server 200 is a web server, the server 200 may configure a content requested by the user terminal 300 in the form of a webpage and provide the content to the user terminal 300. As another example, when the server 200 is a multimedia providing server, the server 200 may configure a multimedia content requested by the user terminal 300 in the form of a transmission file and provide the multimedia content to the user terminal 300.

The server 200 may generate scene meta information for each playback segment including at least one of the time code, the representative image information, the subtitle information, and the audio information based on the image contents and/or subtitle file stored in the database and provide the scene meta information for each playback segment to the user terminal 300. Here, the playback segment for generating the scene meta information may be the subtitle segment or the speech segment. Accordingly, the 'scene meta information for each playback segment may be referred to as 'scene meta information for each subtitle segment' or 'scene meta information for each speech segment'.

The server 200 may transmit the scene meta information to the user terminal 300 together with the image contents and the subtitle file or may transmit the scene meta information to the user terminal 300 separately from the image content and the subtitle file.

The server 200 may provide various video services to the user terminal 300 using the scene meta information regarding the image contents. As an example, the server 200 may provide the video search service to the user terminal 300 using the scene meta information regarding the image contents. Here, the video search service is a video service that helps a viewer to easily and rapidly search a desired scene among scenes included in the image contents.

As another example, the server 200 may provide a video slide service to the user terminal 300 using the scene meta information regarding the image contents. Here, the video slide service is a video service that helps the viewer to easily and rapidly determine contents of a moving image by transferring the moving image by the unit of a page like a book.

To this end, the server 200 may generate page information based on the scene meta information (i.e., the time code, the representative image information, the subtitle information, and the audio information) for each playback segment acquired from the image contents and provide the page information to the user terminal 300. Here, the page information is information for providing the video slide service, and may include only the time code, the representative image information, and the unit subtitle information or may include the time code, the representative image information, the unit subtitle information, and the unit audio information.

The user terminal 300 may provide the communication service based on the information provided from the server 200. As an example, when the server 200 is the web server, the user terminal 300 may provide the web service based on the contents provided from the server 200. As another example, when the server 200 is the multimedia providing server, the user terminal 300 may provide the multimedia service based on the contents provided from the server 200.

The user terminal 300 may download and install an application for reproducing the image contents and providing supplementary services (e.g., the video slide service, the video search service, etc.) related to the image contents. In this case, the user terminal 300 may download the corresponding application by accessing an app store, a play store, a website, etc., or download the corresponding application through a separate storage medium. Further, the user terminal 300 may download the corresponding application through wired/wireless communication with the server 200 or other devices.

The user terminal 300 may receive at least one of the image contents, the subtitle file, the scene meta information regarding the image contents, and the page information corresponding to the scene meta information from the server 200. In this case, at least one of the image contents, the subtitle file, the scene meta information, and the page information may be received in the form of the file or in a streaming scheme.

As another exemplary embodiment, the user terminal 300 may generate the scene meta information for each playback segment based on the image contents and/or the subtitle file received from the server 200 or stored in a memory and generate the page information using the scene meta information for each playback segment. Further, the user terminal 300 may generate the page information based on the scene meta information for each playback segment regarding the image contents received from the server 200 or stored in the memory.

The user terminal 300 may provide a moving image playback service based on the image contents and/or the subtitle file received from the server 200 or stored in the memory. Further, the user terminal 300 may provide the video search service based on the scene meta information for each playback segment regarding the image contents. In addition, the user terminal may provide the video slide service based on the page information using scene meta information for each playback segment.

The user terminal 300 described in this specification may include a cellular phone, a smart phone, a laptop computer, a desktop computer, a digital broadcasting terminal, a personal digital assistants (PDA), a portable multimedia player (PMP), a slate PC, a tablet PC, an ultrabook, a wearable device such as a smartwatch, a smart glass, or a head mounted display (HMD)), etc.

In the exemplary embodiment, it is exemplified that the user terminal 300 provides the moving image playback service, the video search service, or the video slide service by interlocking with the server 200, but the present invention is not limited thereto and it will be apparent to those skilled in the art that the user terminal 300 may provide the services independently without interlocking with the server 200.

Figure 2:
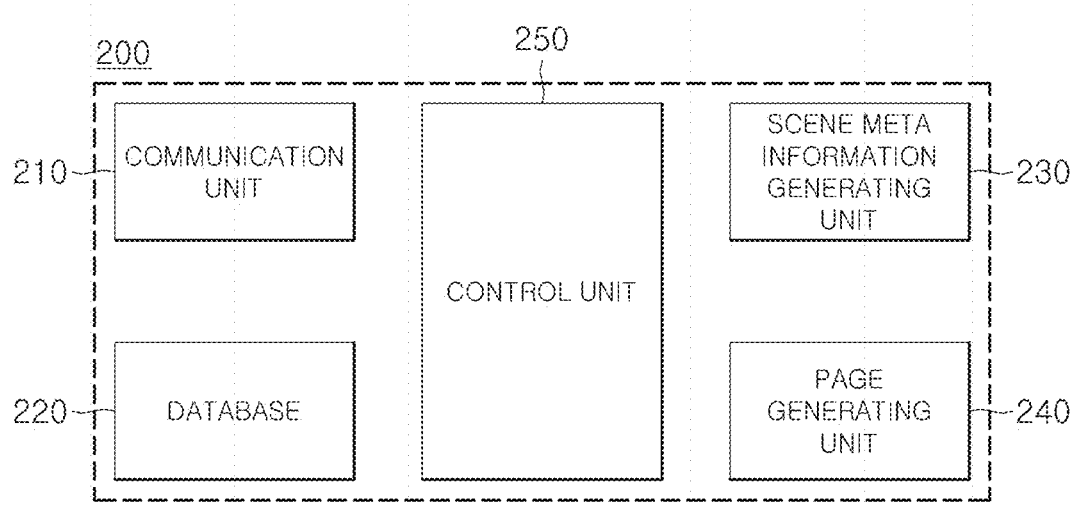
FIG. 2 is a block diagram illustrating a configuration of a server according to an exemplary embodiment of the present invention.

FIG. 2 is a block diagram illustrating a configuration of the server 200 according to an exemplary embodiment of the present invention.

Referring to FIG. 2, the server 200 includes a communication unit 210, a database 220, a scene meta information generating unit 230, a page generating unit 240, and a control unit 250. The components illustrated in FIG. 2 may not all be required in implementing the server 200 and the server described in this specification may thus have components more or less than components listed above.

The communication unit 210 may include a wired communication module for supporting wired communication and a wireless communication module for supporting wireless communication. The wired communication module transmits/receives a wired signal with at least one of another server, a base station, and an access point (AP) on a wired communication network constructed according to technical standards or communication schemes (e.g., Ethernet, Power Line Communication (PLC), Home PNA, IEEE 1394, etc.) for wired communication. The wireless communication module transmits/receives a wireless signal with at least one of the base station, the access point, and the relay on a wireless communication network constructed according to technical standards or communication schemes (e.g., Wireless LAN (WLAN), Wireless-Fidelity (Wi-Fi), Digital Living Network Alliance (DLNA), Global System for Mobile communication (GSM), Code Division Multi Access (CDMA), Wideband CDMA (WCDMA), Long Term Evolution (LTE), Long Term Evolution-Advanced (LTE-A), etc.) for wireless communication.

In the exemplary embodiment, the communication unit 210 may perform a function to transmit to the user terminal 300 the image contents stored in the database 220, the subtitle file regarding the image contents, the scene meta information for each playback segment regarding the image contents, the page information corresponding to the scene meta information for each playback segment, etc. Further, the communication unit 210 may perform a function to receive information on the communication service requested by the user terminal 300.

The database 220 may perform a function to store information (or data) received from the user terminal 300 or other servers (not illustrated), information (or data) autonomously generated by the server 200, information (or data) to be provided to the user terminal 300 or the other servers, etc.

In the exemplary embodiment, the database 200 may store a plurality of image contents, subtitle files regarding the plurality of image contents, scene meta information for each playback segment regarding the plurality of image contents, page information corresponding to the scene meta information for each playback segment, etc.

The scene meta information generating unit 230 may generate scene meta information for each playback segment including at least one of the time code, the representative image information, the subtitle information, and the audio information based on the image contents and/or subtitle file stored in the database 220.

To this end, the scene meta information generating unit 230 may extract a plurality of speech segments based on the audio information extracted from the image contents and correct the existing subtitle information or generate new subtitle information by speech-recognizing audio information in each speech segment. Further, the scene meta information generating unit 230 may extract a plurality of speech segments based on the audio information extracted from the image contents and select a representative image in each speech segment through speech recognition and image recognition for the audio and image information in each speech segment.

The page generating unit 240 may generate page information based on the scene meta information of each playback segment regarding the image contents. That is, the page generating unit 240 may generate the page using the time code, the representative image information, and the subtitle information (i.e., the unit subtitle information). According to an implementation example, the page generating unit 240 may generate the page using the time code, the representative image information, the subtitle information (i.e., the unit subtitle information), and the audio information (i.e., unit audio information).

The page information is information for providing the video slide service, and may include only the time code, the representative image information, and the subtitle information or include the time code, the representative image information, the subtitle information, and the audio information.

The representative image information as image information representing the corresponding page may include at least one of continuous image frames of the image contents reproduced within the subtitle or speech segment. More specifically, the representative image information may be an image frame arbitrarily selected among the image frames in the subtitle or speech segment or an image frame (e.g., an image frame in a first order, an image frame in a middle order, an image frame in a last order, an image frame most similar to the subtitle information, etc., in the subtitle or speech segment) selected according to a predetermined rule among the image frames.

The control unit 250 controls all operations of the server 200. Further, the control unit 250 may combine and control at least one of the components described above in order to implement various exemplary embodiments described below on the server 200 according to the present invention.

In the exemplary embodiment, the control unit 250 may provide the communication service requested by the user terminal 300. As an example, the control unit 250 may provide the moving image playback service, the video search service, or the video slide service to the user terminal 300.

To this end, the control unit 250 may provide to the user terminal 300 the image contents stored in the database 220 and the subtitle file regarding the image contents. Further, the control unit 250 may generate the scene meta information for each playback segment regarding the image contents based on the image contents and/or the subtitle file and provide the generated scene meta information to the user terminal 300. In addition, the control unit 250 may generate the page information based on the scene meta information for each playback segment regarding the image contents and provide the generated page information to the user terminal 300.

The control unit 250 may be a processor or multiple processors. When the control unit 250 is the processor, the processor may comprise the scene meta information generating unit 230 and the page generating unit 240.

Figure 9:
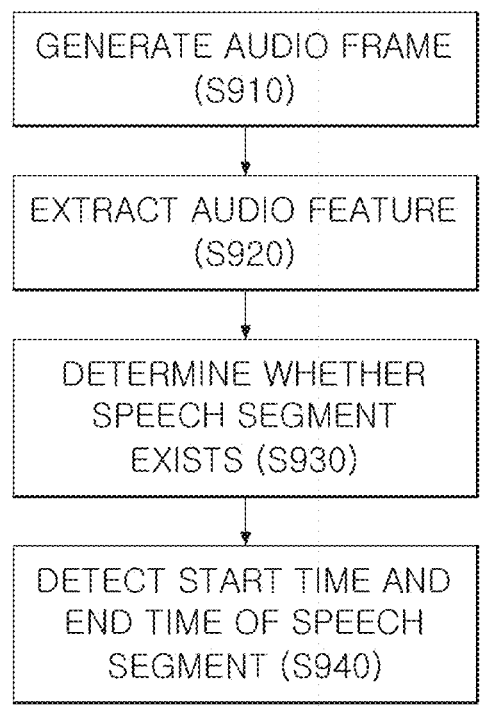
FIG. 9 is a diagram illustrating an operation process of a speech segment analyzing unit according to an exemplary embodiment of the present invention.
Figure 10:
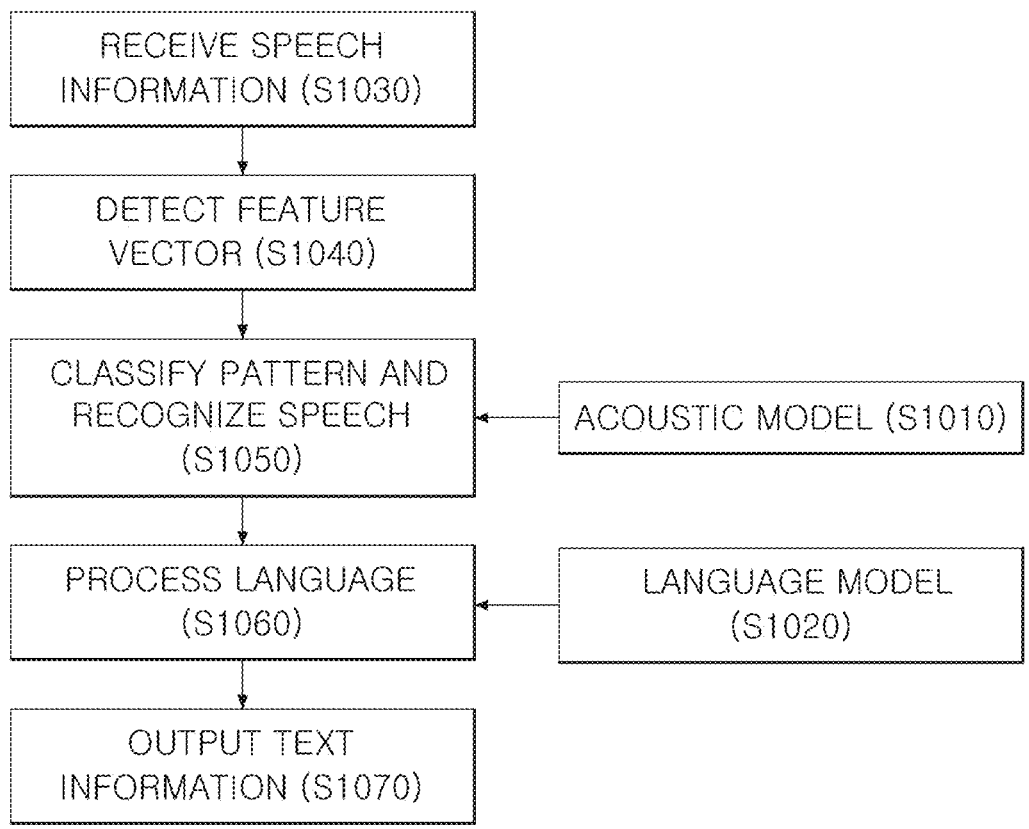
FIG. 10 is a diagram illustrating an operation process of a speech recognizing unit according to an exemplary embodiment of the present invention.
Figure 11:
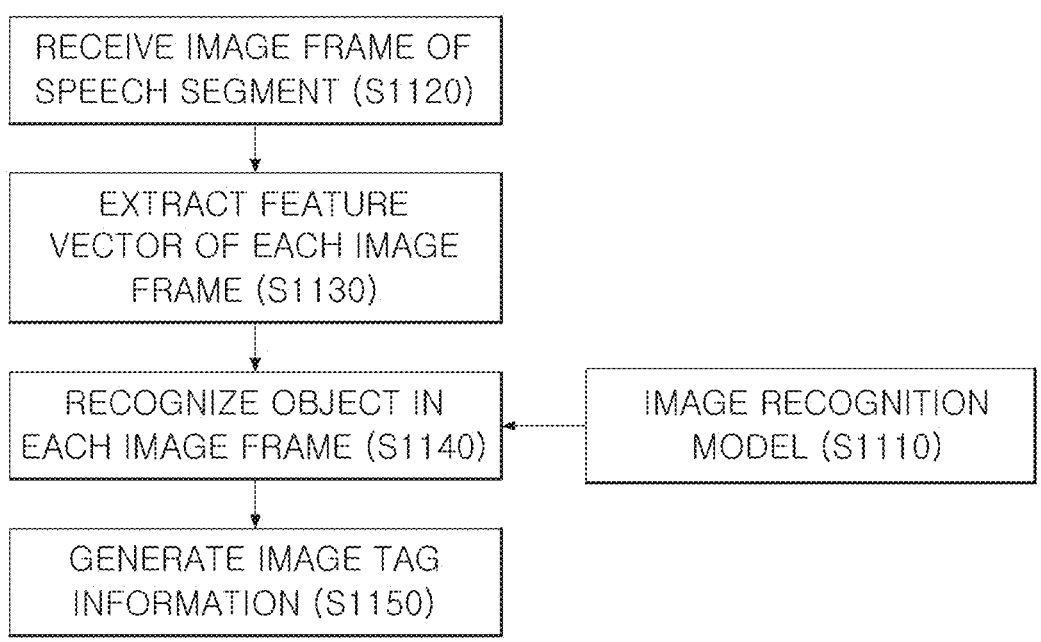
FIG. 11 is a diagram illustrating an operation process of an image tagging unit according to an exemplary embodiment of the present invention.
Figure 13:
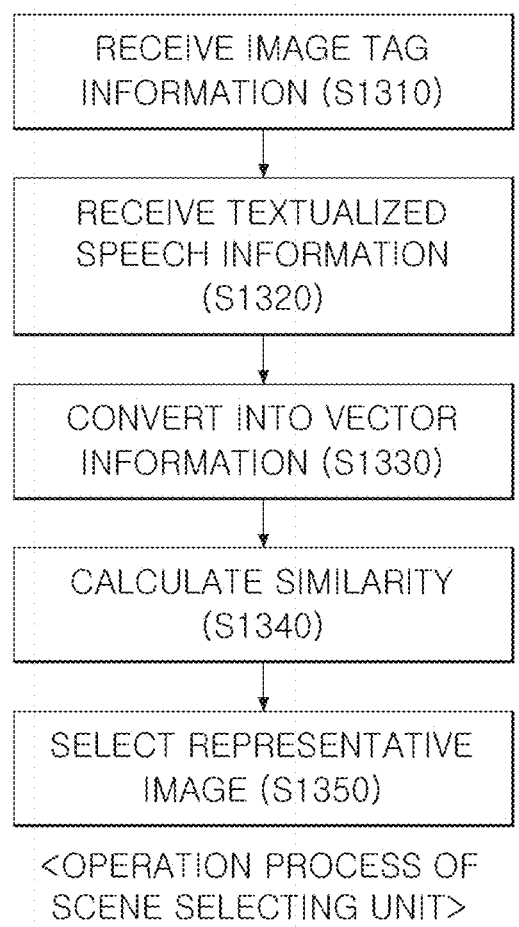
FIG. 13 is a diagram illustrating an operation process of a scene selecting unit according to an exemplary embodiment of the present invention.

Although it is not shown in drawings, the processor may comprise functional units (i.e. means) for performing S910 to S940 steps of FIG. 9, S1010 to S1070 steps of FIG. 10, S1110 to S1150 steps of FIG. 11 and S1310 to S1350 steps of FIG. 13. For example, the processor may comprise a subtitle information generating unit for detecting a plurality of unit subtitles based on a subtitle file related to image contents and correcting the plurality of unit subtitles, an audio information generating unit for extracting audio information from the image contents, detecting a plurality of speech segments based on the audio information, and performing speech-recognition on audio information in each speech segment and an image information generating unit for detecting a video segment corresponding to each speech segment, performing image-recognition on image frames in the video segment, and selecting a representative image from the image frames.

Figure 3:
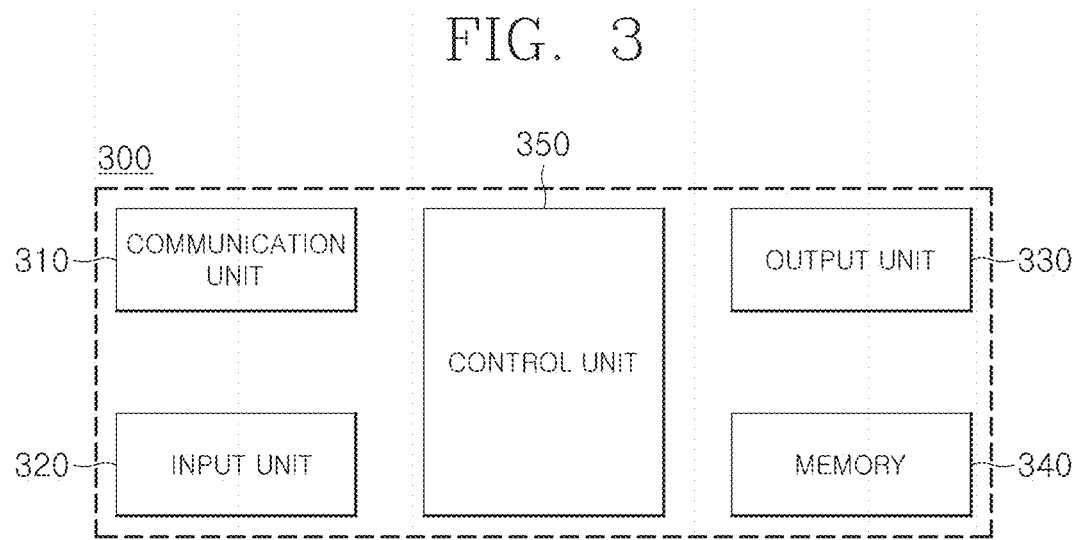
FIG. 3 is a block diagram illustrating a configuration of a user terminal according to an exemplary embodiment of the present invention.

FIG. 3 is a block diagram illustrating a configuration of the user terminal 300 according to an exemplary embodiment of the present invention.

Referring to FIG. 3, the user terminal 300 includes a communication unit 310, an input unit 320, an output unit 330, a memory 340, and a control unit 350. The components illustrated in FIG. 3 may not all be required in implementing the user terminal 300 and the user terminal described in this specification may thus have components more or less than components listed above.

The communication unit 310 may include a wired communication module for supporting a wired network and a wireless communication module for supporting a wireless network. The wired communication module transmits/receives the wired signal with at least one of an external server and the other terminals on a wired communication network constructed according to technical standards or communication schemes (e.g., Ethernet, Power Line Communication (PLC), Home PNA, IEEE 1394, etc.) for wired communication. The wireless communication module transmits/receives a wireless signal with at least one of the base station, the access point, and the relay on a wireless communication network constructed according to technical standards or communication schemes (e.g., Wireless LAN (WLAN), Wireless-Fidelity (Wi-Fi), Digital Living Network Alliance (DLNA), Global System for Mobile communication (GSM), Code Division Multi Access (CDMA), Wideband CDMA (WCDMA), Long Term Evolution (LTE), Long Term Evolution-Advanced (LTE-A), etc.) for wireless communication.

In the exemplary embodiment, the communication unit 310 may perform a function to receive from the server 200 the image contents, the subtitle file regarding the image contents, the scene meta information for each playback segment regarding the image contents, the page information corresponding to the scene meta information for each playback segment, etc. Further, the communication unit 310 may perform a function to transmit to the server 200 the information on the communication service requested by the user terminal 300.

The input unit 320 may include a camera for inputting an image signal, a microphone for inputting an audio signal, a user input unit (e.g., a keyboard, a mouse, a touch key, a push key (mechanical key), etc.) for receiving information from a user, etc. Data acquired by the input unit 320 may be analyzed and processed by a control command of a terminal user. In the exemplary embodiment, the input unit 320 may receive command signals related to playback of the image contents.

The output unit 330 which is used for generating an output related with sight, hearing, or touch may include at least one of a display unit, a sound output unit, a haptic module, and a light output unit.

The display unit displays (outputs) information processed by the user terminal 300. In the exemplary embodiment, the display unit may display execution screen information of a moving image playback program driven by the user terminal 300 or user interface (UI) information and graphic user interface (GUI) information depending on the execution screen information.

The display unit may have a mutual layer structure with a touch sensor or may be integrally formed to implement a touch screen. Such a touch screen may serve as a user input unit for providing an input interface between the user terminal 300 and the viewer and provide an output interface between the user terminal 300 and the viewer.

The sound output unit may output audio data received from the communication unit 310 or stored in the memory 340. In the exemplary embodiment, the sound output unit may output a sound signal related to the image contents reproduced by the user terminal 300.

The memory 340 stores data supporting various functions of the user terminal 300. In the exemplary embodiment, the memory 340 may store a moving image reproducing program (an application program or an application) that is driven by the user terminal 300, and data and commands for the operation of the user terminal 300. Further, the memory 340 may store a plurality of image contents, subtitle files regarding the plurality of image contents, scene meta information for each playback segment regarding the plurality of image contents, page information corresponding to the scene meta information for each playback segment, etc.

The memory 340 may include at least one type of storage medium of a flash memory type storage medium, a hard disk type storage medium, a solid state disk (SSD) type storage medium, a silicon disk drive (SDD) type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The control unit 350 controls an operation related to the moving image playback program stored in the memory 340 and an overall operation of the user terminal 300 in general. Furthermore, the control unit 350 may combine and control at least one of the components described above in order to implement various exemplary embodiments described below on the user terminal 300 according to the present invention.

In the exemplary embodiment, the control unit 350 may provide a moving image playback service based on the image contents and/or the subtitle file received from the server 200 or stored in the memory 340. Further, the control unit 350 may provide a video search service based on the scene meta information for each playback segment regarding the image contents. In addition, the control unit 350 may provide the video slide service based on the page information generated through scene meta information for each playback segment.

The control unit 350 may generate the scene meta information for each playback segment based on the image contents and/or the subtitle file received from the server 200 or stored in the memory 340 and generate the page information using the scene meta information for each playback segment. Further, the control unit 300 may generate the page information based on the scene meta information for each playback segment regarding the image contents received from the server 200 or stored in the memory 340.

The control unit 350 may be a processor or multiple processors. Although it is not shown in drawings, the processor may comprise functional units (i.e. means) for performing S910 to S940 steps of FIG. 9, S1010 to S1070 steps of FIG. 10, S1110 to S1150 steps of FIG. 11 and S1310 to S1350 steps of FIG. 13. For example, the processor may comprise a subtitle information generating unit for detecting a plurality of unit subtitles based on a subtitle file related to image contents and correcting the plurality of unit subtitles, an audio information generating unit for extracting audio information from the image contents, detecting a plurality of speech segments based on the audio information, and performing speech-recognition on audio information in each speech segment and an image information generating unit for detecting a video segment corresponding to each speech segment, performing image-recognition on image frames in the video segment, and selecting a representative image from the image frames.

Figure 4:
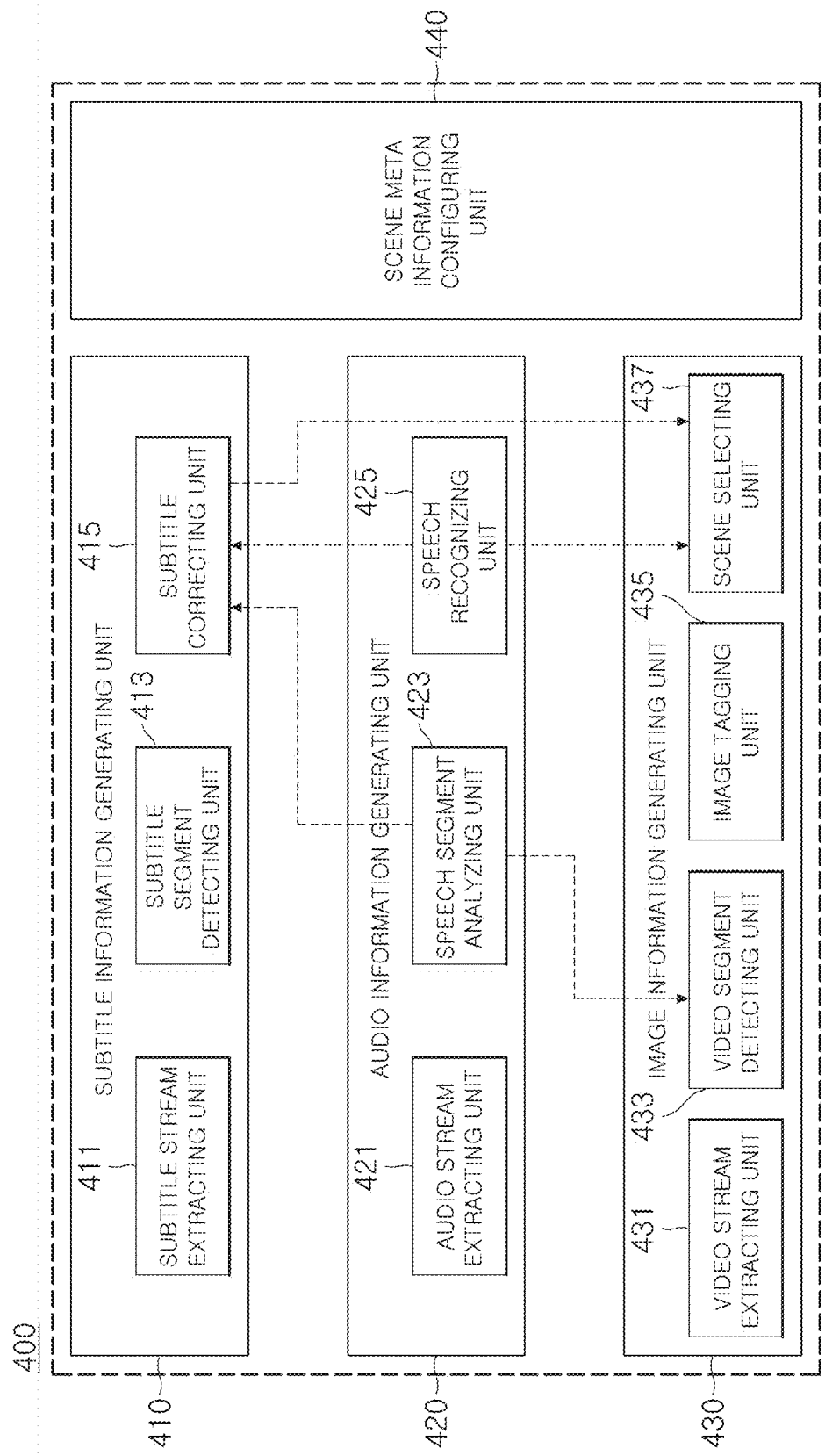
FIG. 4 is a block diagram illustrating a configuration of a scene meta information generating apparatus according to an exemplary embodiment of the present invention.

FIG. 4 is a block diagram illustrating a configuration of the scene meta information generating apparatus according to an exemplary embodiment of the present invention.

Referring to FIG. 4, a scene meta information generating apparatus 400 according to an exemplary embodiment of the present invention includes a subtitle information generating unit 410, an audio information generating unit 420, an image information generating unit 430, and a scene meta information configuring unit 440. The components illustrated in FIG. 4 may not all be required in implementing the scene meta information generating apparatus 400 and the scene meta information generating apparatus described in this specification may thus have components more or less than components listed above.

The scene meta information generating apparatus 400 according to an exemplary embodiment of the present invention may be implemented through the scene meta information generating unit 230 of the server 200 or implemented through the control unit 350 of the user terminal 300. That is, the scene meta information generating apparatus 400 may be implemented in the server 200 or the user terminal 300. In addition, the scene meta information generating apparatus 400 may be implemented through separate hardware and/or software regardless of the server 200 and the user terminal 300.

The subtitle information generating unit 410 classifies all subtitles into a plurality of unit subtitles based on the subtitle file related to the image contents and detect the subtitle segments of the plurality of unit subtitles and detect subtitle text information corresponding to each subtitle segment. Further, the subtitle information generating unit 410 may correct the plurality of unit subtitles by using the audio information extracted from the image contents.

The subtitle information generating unit 410 includes a subtitle stream extracting unit (or a subtitle extracting unit) 411 for detecting the unit subtitles related to the image contents, a subtitle segment detecting unit 413 for detecting the subtitle segments of the unit subtitles, and a subtitle correcting unit 415 for correcting the unit subtitles.

The subtitle stream extracting unit 411 may extract the subtitle stream based on the subtitle file included in the image contents. Meanwhile, as another exemplary embodiment, the subtitle stream extracting unit 411 may extract the subtitle stream based on the subtitle file stored separately from the image contents.

The subtitle stream extracting unit 411 may classify the subtitle stream of the image contents into the plurality of unit subtitles and detect text information of each unit subtitle. Here, the plurality of unit subtitles may be classified according to the length of the subtitle (for example, the length of a subtitle text and the length of the subtitle segment) or may be classified per sentence and the present invention is not limited thereto.

The subtitle segment detecting unit 413 may detect a subtitle segment in which each unit subtitle is displayed among the playback segments of the image contents. That is, the subtitle segment detecting unit 413 may detect 'subtitle start time information' on the playback time of the image contents in which the display of each unit subtitle starts, 'subtitle end time information' on the production time of the image contents in which the display of each unit subtitle ends, and 'subtitle display time information' on a time when the display of each unit subtitle is maintained.

The subtitle correcting unit 415 may correct the subtitle segments of the plurality of unit subtitles based on the speech segments analyzed through the audio information of the image contents. That is, the subtitle correcting unit 415 may enlarge, reduce, or move the subtitle segment of each unit subtitle in accordance with the speech segment of audio corresponding to the corresponding subtitle.

Figure 5:
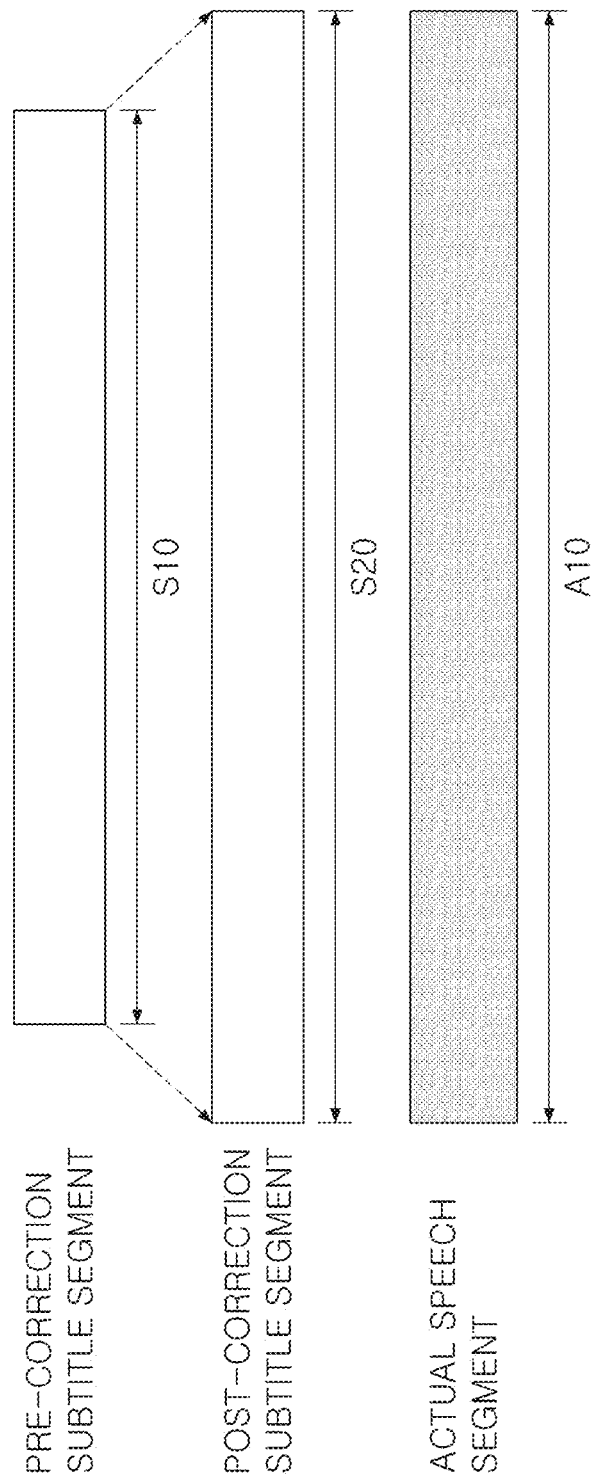
FIG. 5 is a diagram referred to describe an operation of extending a time code of a unit subtitle according to a speech segment.

When a subtitle segment S10 of a specific unit subtitle is smaller than a speech segment A10 of the audio corresponding to the corresponding subtitle as illustrated in FIG. 5, the subtitle correcting unit 415 may enlarge the subtitle segment of the corresponding segment in accordance with the speech segment A10 of the audio corresponding to the corresponding subtitle (S10→S20).

Although not illustrated in the figure, when the subtitle segment of the specific unit subtitle is larger than the speech segment of the audio corresponding to the corresponding subtitle, the subtitle segment of the corresponding segment may be reduced in accordance with the speech segment of the audio corresponding to the corresponding subtitle.

The subtitle correcting unit 415 may correct the subtitle text information of the plurality of unit subtitles by speech-recognizing the audio information in each speech segment. That is, the subtitle correcting unit 415 may correct the text information of each unit subtitle in accordance with the audio information textualized through speech recognition. Further, the subtitle correcting unit 415 may delete an unnecessary subtitle which exists in a non-speech segment based on a result of speech-recognizing the audio information in each speech segment.

Figure 6:
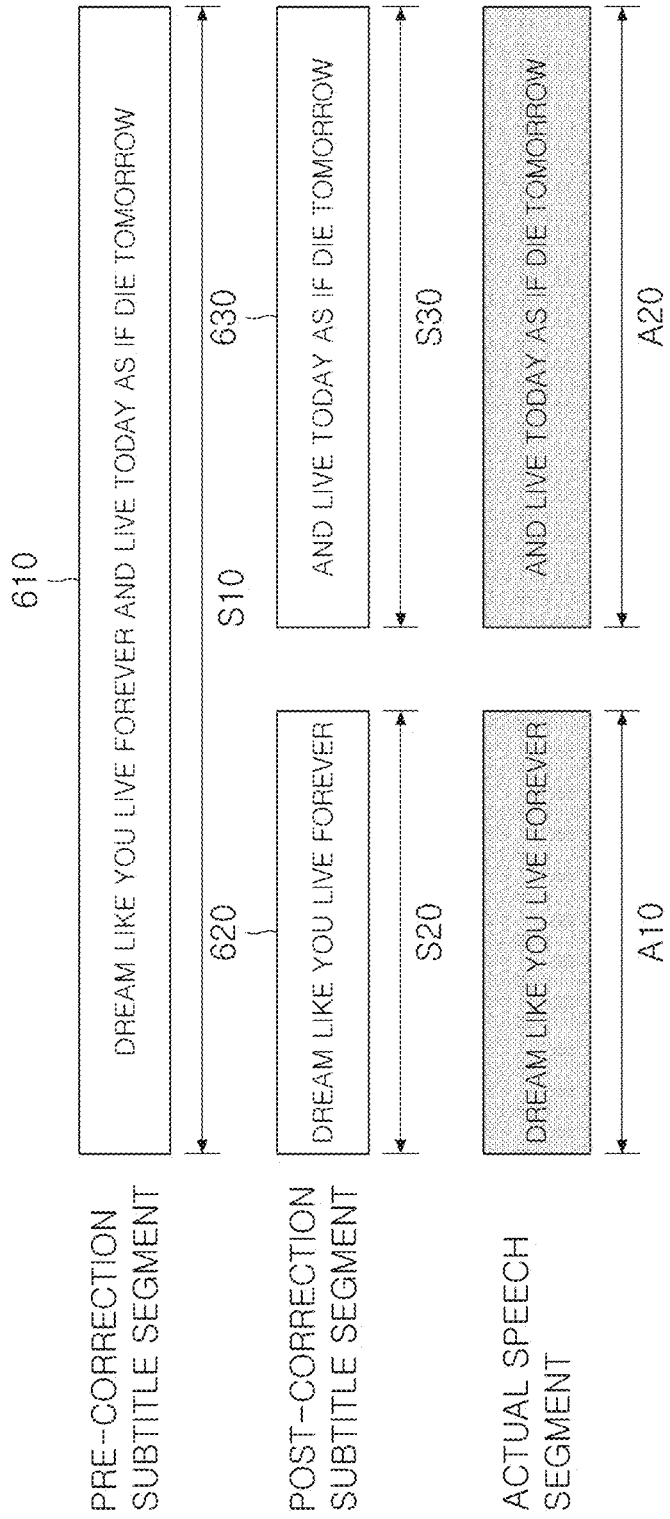
FIG. 6 is a diagram referred to describe an operation of dividing one unit subtitle into two or more unit subtitles.

The subtitle correcting unit 415 may divide one unit subtitle into two or more unit subtitles by speech-recognizing the audio information in each speech segment. When a corresponding unit subtitle 610 is constituted by two speech segments A10 and A20 as the result of speech-recognizing the audio information in the unit subtitle segment S10 as illustrated in FIG. 6, the subtitle correcting unit 415 may divide one unit subtitle 610 into two unit subtitles 620 and 630 corresponding to the speech segments A10 and A20.

Figure 7:
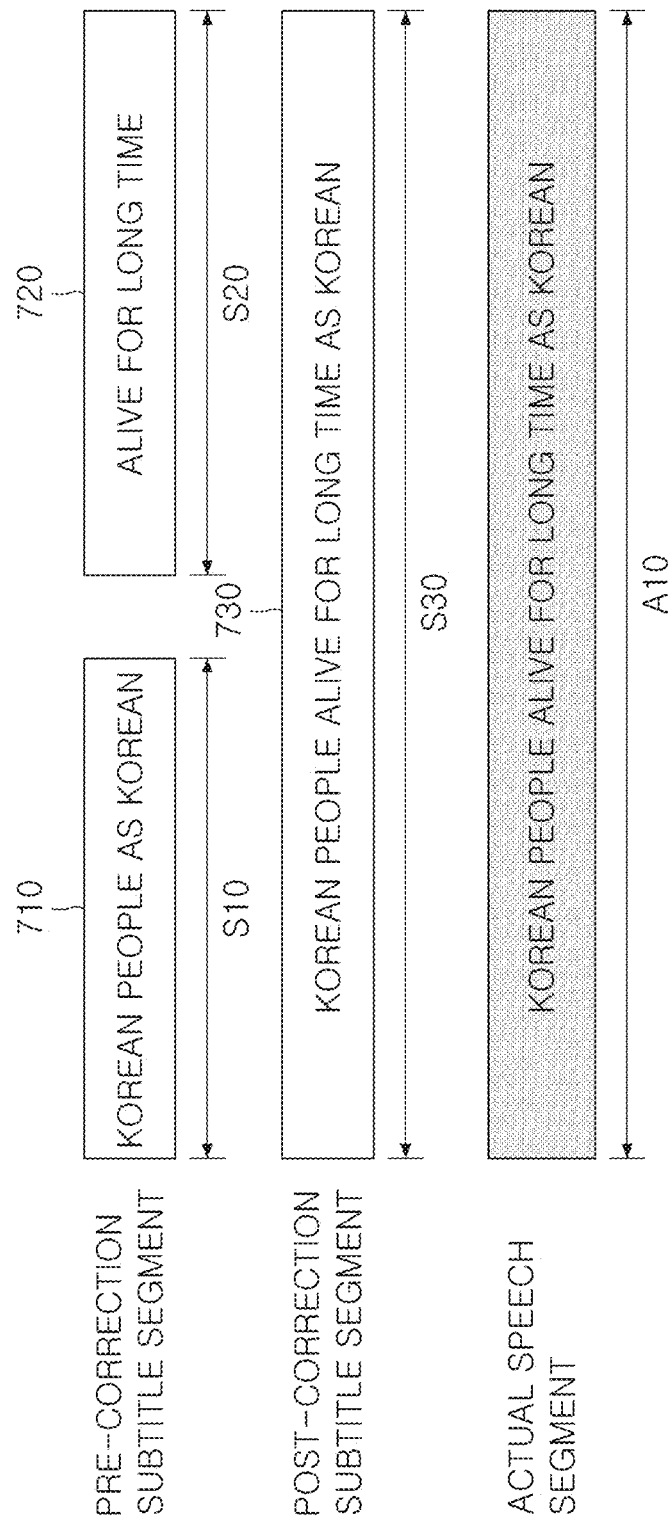
FIG. 7 is a diagram referred to describe an operation of merging two or more unit subtitles into one unit subtitle.

The subtitle correcting unit 415 may merge two or more unit subtitles into one unit subtitle by speech-recognizing the audio information in each speech segment. When first and second unit subtitles 710 and 720 adjacent to each other are constituted by one speech segment A10 as the result of speech-recognizing the audio information in the first unit subtitle segment S10 and the audio information in the second unit subtitle segment S20 as illustrated in FIG. 7, the subtitle correcting unit 415 may merge two unit subtitles 710 and 720 into one unit subtitle 620 or 630 corresponding to the speech segment A10.

When languages of the subtitle information and the audio information are different from each other, the subtitle correcting unit 415 may merge two or more unit subtitles by the unit of the sentence in order to maintain the meaning of the sentence.

The audio information generating unit 420 may detect a plurality of unit audio information corresponding to the plurality of unit subtitles based on the audio information extracted from the image contents. Further, the audio information generating unit 420 may analyze the plurality of speech segments based on the audio information extracted from the image contents and speech-recognize the audio information in each speech segment. The audio information generating unit 420 may provide the speech information textualized through the speech recognition to the subtitle information generating unit 410 and the image information generating unit 430.

The audio information generating unit 420 includes an audio stream extracting unit (or an audio extracting unit) 421 for detecting the audio information of the image contents, a speech segment analyzing unit 423 for detecting the speech segments of the image contents, and a speech recognizing unit 425 for speech-recognizing the audio information in each speech segment.

The audio stream extracting unit 421 may extract an audio stream based on an audio file included in the image contents. The audio stream extracting unit 421 may divide the audio stream into a plurality of audio frames suitable for signal processing. Here, the audio stream may include a speech stream and a non-speech stream.

The speech segment analyzing unit 423 may detect a start time and an end time of each speech segment by extracting features of the audio frame. Here, the start time of each speech segment corresponds to the playback time of the image contents at which the speech output starts in the corresponding segment and the end time of each speech segment corresponds to the playback time of the image contents at which the speech output ends in the corresponding segment.

The speech segment analyzing unit 423 may provide information on a plurality of speech segments to the subtitle correcting unit 415 and a video segment extracting unit 433. The speech segment analyzing unit 423 will be described later in detail with reference to FIG. 9.

The speech recognizing unit 425 may generate textualized speech information by speech-recognizing the audio information (i.e., speech information) in each speech segment. The speech recognizing unit 425 may provide the textualized speech information to the subtitle correcting unit 415 and a scene selecting unit 437. The speech recognizing unit 425 will be described later in detail with reference to FIG. 10.

The image information generating unit 430 may detect a video segment corresponding to each speech segment and select a scene image (i.e., representative image) most similar to the subtitle text information or the textualized speech information among a plurality of scene images which exist in the video segment.

The image information generating unit 430 includes a video stream extracting unit (or an image extracting unit) 431 for detecting image information of the image contents, a video segment detecting unit 433 for detecting the video segment corresponding to each speech segment, an image tagging unit 435 for generating tag information from images in each video segment, and the scene selection unit 437 for selecting the representative image among the images in each video segment.

The video stream extracting unit 431 may extract the video stream based on a moving image file included in the image contents. Here, the video stream may be constituted by continuous image frames.

The video segment extracting unit 433 may detect (separate) the video segment corresponding to each speech segment in the video stream. This is to reduce a time and cost required for image processing by excluding a video segment (i.e., a video segment corresponding to the non-speech segment) with relatively low importance.

The image tagging unit 435 may generate image tag information by image-recognizing a plurality of images which exists in each video segment. That is, the image tagging unit 435 may generate the image tag information by recognizing object information (e.g., person, object, text, etc.) in each image. The image tagging unit 435 will be described later in detail with reference to FIG. 11.

The scene selecting unit 437 may select an image (i.e., representative image) having a highest similarity (level) in comparison to the textualized speech information among the plurality of images which exists in each video segment. As another embodiment, the scene selecting unit 437 may select an image (i.e., representative image) having the highest similarity in comparison to the subtitle text information among the plurality of images which exists in each video segment. The scene selecting unit 437 will be described later in detail with reference to FIG. 12.

The scene meta information configuring unit 440 may configure scene meta information for each playback segment based on the subtitle segment information, the speech segment information, the unit subtitle information, the unit audio information, and the representative image information acquired from the subtitle information generating unit 410, the audio information generating unit 420, and the image information generating unit 430.

As an example, as illustrated in FIG. 8, the scene meta information configuring unit 440 may generate a scene meta information frame 800 including an ID field 810, a time code field 820, a representative image field 830, a speech field 840, a subtitle field 850, and an image tag field 860. In this case, the scene meta information configuring unit 440 may generate scene meta information frames as many as the subtitle or speech segments.

The ID field 810 is a field for identifying the scene meta information for each playback segment and the time code field 820 is a field for indicating a subtitle segment or a speech segment corresponding to the scene meta information. More preferably, the time code field 820 is a field for indicating the speech segment corresponding to the scene meta information.

The representative image field 830 is a field for representing the representative image for each speech segment and the speech field 840 is a field for indicating the speech (audio) information for each speech segment. In addition, the subtitle field 850 is a field for indicating the subtitle text information for each subtitle segment and the image tag field 860 is a field for indicating the image tag information for each speech segment.

When the representative images of the scene meta information of adjacent playback segments are similar to each other (i.e. when the similarity between the representative images is more than a predetermined similarity level), the scene meta information configuring unit 440 may merge the corresponding scene meta information into one scene meta information. In this case, the scene meta information configuring unit 440 may determine the similarity of the representative images of the scene meta information using a predetermined similarity measurement algorithm (e.g., a cosine similarity measurement algorithm, a Euclidean similarity measurement algorithm, and the like).

As described above, the scene meta information generating apparatus according to the present invention may generate the scene meta information for each playback segment based on the image contents and/or the subtitle file. Such scene meta information may be used to search and classify a main scene of the image contents. Further, the scene meta information may be used to provide the moving image service, the image service, the speech service, the video slide service, and the like.

The scene meta information generating apparatus 400 may be implemented by a processor or multiple processors. Although it is not shown in drawings, the processor may comprise functional units (i.e. means) for performing at least one of S910 to S940 steps of FIG. 9, S1010 to S1070 steps of FIG. 10, S1110 to S1150 steps of FIG. 11 and S1310 to S1350 steps of FIG. 13. For example, the processor may comprise a subtitle information generating unit for detecting a plurality of unit subtitles based on a subtitle file related to image contents and correcting the plurality of unit subtitles, an audio information generating unit for extracting audio information from the image contents, detecting a plurality of speech segments based on the audio information, and performing speech-recognition on audio information in each speech segment and an image information generating unit for detecting a video segment corresponding to each speech segment, performing image-recognition on image frames in the video segment, and selecting a representative image from the image frames.

FIG. 9 is a diagram illustrating an operation process of the speech segment analyzing unit 423 according to an exemplary embodiment of the present invention.

Referring to FIG. 9, the speech segment analyzing unit 423 according to the present invention may divide an audio stream into a plurality of audio frames having a size suitable for signal processing (S910). In this case, each audio frame may have a size of 20 ms to 30 ms.

The speech segment analyzing unit 423 may extract features of the corresponding audio frame by analyzing frequency components, pitch components, mel-frequency cepstral coefficients (MFCC), and linear predictive coding (LPC) coefficients of each audio frame (S920).

The speech segment analyzing unit 423 may determine whether each audio frame is the speech segment using the features of each audio frame and a predetermined speech model (S930). In this case, as the speech model, at least one of a support vector machine (SVM) model, a hidden Markov model (HMM) model, a Gaussian mixture model (GMM) model, a Recurrent Neural Networks (RNN) model, and a Long Short-Term Memory (LSTM) model may be used and the present invention is not particularly limited thereto.

The speech segment analyzing unit 423 may detect the start time and the end time of each speech segment by combining the speech segments for each audio frame (S940). Here, the start time of each speech segment corresponds to the playback time of the image contents at which the speech output starts in the corresponding segment and the end time of each speech segment corresponds to the playback time of the image contents at which the speech output ends in the corresponding segment.

FIG. 10 is a diagram illustrating an operation process of the speech recognizing unit 425 according to an exemplary embodiment of the present invention.

Referring to FIG. 10, the speech recognizing unit 425 may include an acoustic model and a language model for speech recognition.

The speech recognizing unit 425 may extract the feature of data stored in a speech database (DB) and construct the acoustic model by learning the extracted feature for a predetermined period (S1010).

The speech recognizing unit 425 may extract the feature of the data stored in a speech database (DB) and construct the language model by learning the extracted feature for a predetermined period (S1020).

When the acoustic model and the language model is constructed, the speech recognizing unit 425 may receive the audio information (i.e., speech information) by the unit of the speech segment (S1030). Here, the speech information is unit speech information corresponding to the unit subtitle.

The speech recognizing unit 425 may detect characteristic vectors of the corresponding speech information by analyzing the frequency component, a pitch component, an energy component, a zero crossing component, an MFCC coefficient, an LPC coefficient, a Perceptual Linear Predictive (PLP) coefficient of the speech information (S1040).

The speech recognition unit 425 may classify (analyze) patterns of the detected feature vectors using a predetermined acoustic model (S1050). In this case, the speech recognizing unit 425 may classify the patterns of the feature vectors by using a known algorithm such as a Dynamic Time Warping (DTW) algorithm, a Hidden Markov Model (HMM) algorithm, an Artificial Neural Network (ANN) algorithm, or the like. The speech recognizing unit 425 may detect one or more candidate words by recognizing the speech through such pattern classification.

The speech recognizing unit 425 may organize candidate words as the sentence by using a predetermined language model (S1060). The speech recognizing unit 425 may output the text information configured by the sentence.

FIG. 11 is a diagram illustrating an operation process of the image tagging unit 435 according to an exemplary embodiment of the present invention.

Referring to FIG. 11, the image tagging unit 435 according to the present invention may include an image recognition model for recognizing objects included in the image frame.

The image tagging unit 435 may extract a geometric feature of data stored in the image database (DB) and construct the image recognition model by learning the extracted geometric feature for a predetermined period (S1110). As the image recognition model, a deep learning based artificial neural network model such as a Convolution Neutral Network (CNN) model, a Recurrent Neural Network (RNN) model, a Restricted Boltzmann Machine (RBM) model, and a Deep Belief Network (DBN) may be used and the present invention is not particularly limited thereto.

When the construction of the image recognition model is completed, the image tagging unit 435 may sequentially receive the image frames of the video segment corresponding to each speech segment (S1120).

The image tagging unit 435 may divide each image frame into multiple regions and detect the feature vectors for each region (S1130). As another exemplary embodiment, the image tagging unit 435 may detect the feature vectors by the unit of one image frame without dividing each image frame into multiple regions.

The image tagging unit 435 may classify the patterns of the detected feature vectors using the image recognition model and recognize the objects existing in each image frame based on the classified patterns (S1140).

The image tagging unit 435 may generate image tag information based on an image recognition result for each image frame (S1150). Here, the image tag information includes information on all objects existing in each image frame.

Figure 12:
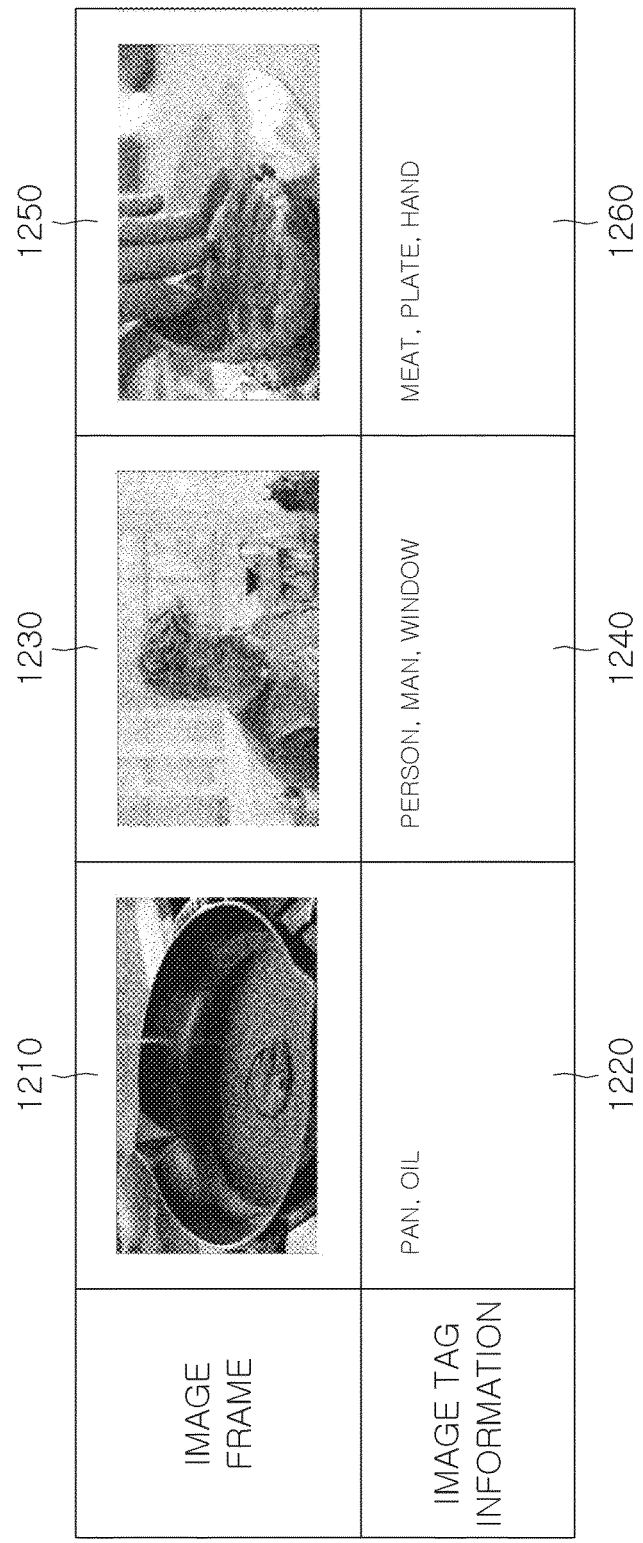
FIG. 12 is a diagram illustrating image tag information corresponding to each image frame.

For example, as illustrated in FIG. 12, the image tagging unit 435 may generate first image tag information (i.e., pan and oil) 1220 through image recognition for a first image frame 1210. Further, the image tagging unit 435 may generate second image tag information (i.e., person, man, and window) 1240 through image recognition for a second image frame 1230. In addition, the image tagging unit 435 may generate third image tag information (i.e., meat, plate, and hand) 1260 through image recognition for a third image frame 1250.

FIG. 13 is a diagram illustrating an operation process of the scene selecting unit 437 according to an exemplary embodiment of the present invention.

Referring to FIG. 13, the scene selecting unit 437 according to the present invention may receive image frames of the video segment corresponding to each speech segment and image tag information corresponding to the image frames (S1310).

The scene selecting unit 437 may receive the speech information textualized for each speech segment from the speech information generating unit 420 (S1320).

The scene selecting unit 437 may convert the textualized speech information and the plurality of image tag information into vector information (or vector values) using a predetermined word embedding model (S1330). Here, word embedding means a converted value that may represent one word on a vector space using an artificial neural network. For example, as shown in Equation 1 below, a word such as "cat" or "mat" may be changed to a vector of a specific dimension.

$$W(\text{"cat"})=(0.2,-0.4,0.7,\ldots)$$

$$W(\text{"mat"})=(0.0,0.6,-0.1,\ldots) \quad [\text{Equation 1}]$$

As the word embedding model usable in the exemplary embodiment, an artificial neural network model such as a Neural Net Language Model (NNLM) model and a Recurrent Neural Net Language Model (RNNLM) model may be used and more preferably, a Word2Vec model may be used.

The Word2 Vec model is significantly different from a Neural Net based learning method, but may perform learning several times faster than the existing method by significantly reducing a calculation amount. The Word2Vec model as a network model for learning languages (i.e., words) provides a Continuous Bag-of-Words (CBOW) model and a Skip-gram model.

The scene selecting unit 437 may measure a similarity between first vector information corresponding to the image tag information and second vector information corresponding to the textualized speech information by using a predetermined similarity measurement technique (S1340). As the similarity measurement technique, at least one of a cosine similarity measurement technique, a Euclidean similarity measurement technique, a similarity measurement technique using a Jacquard coefficient, a similarity measurement technique using a Pearson correlation coefficient, and a similarity measurement technique using a Manhattan distance may be used and the present invention is not particularly limited thereto.

The scene selecting unit 437 may sequentially perform similarity measurement on a plurality of image tag information corresponding to the video frames of each video segment based on the textualized speech information.

The scene selecting unit 437 may select an image frame corresponding to image tag information having a highest similarity in comparison to the textualized speech information among the image frames of each video segment as the representative image of the corresponding segment (S1350).

Figure 14:
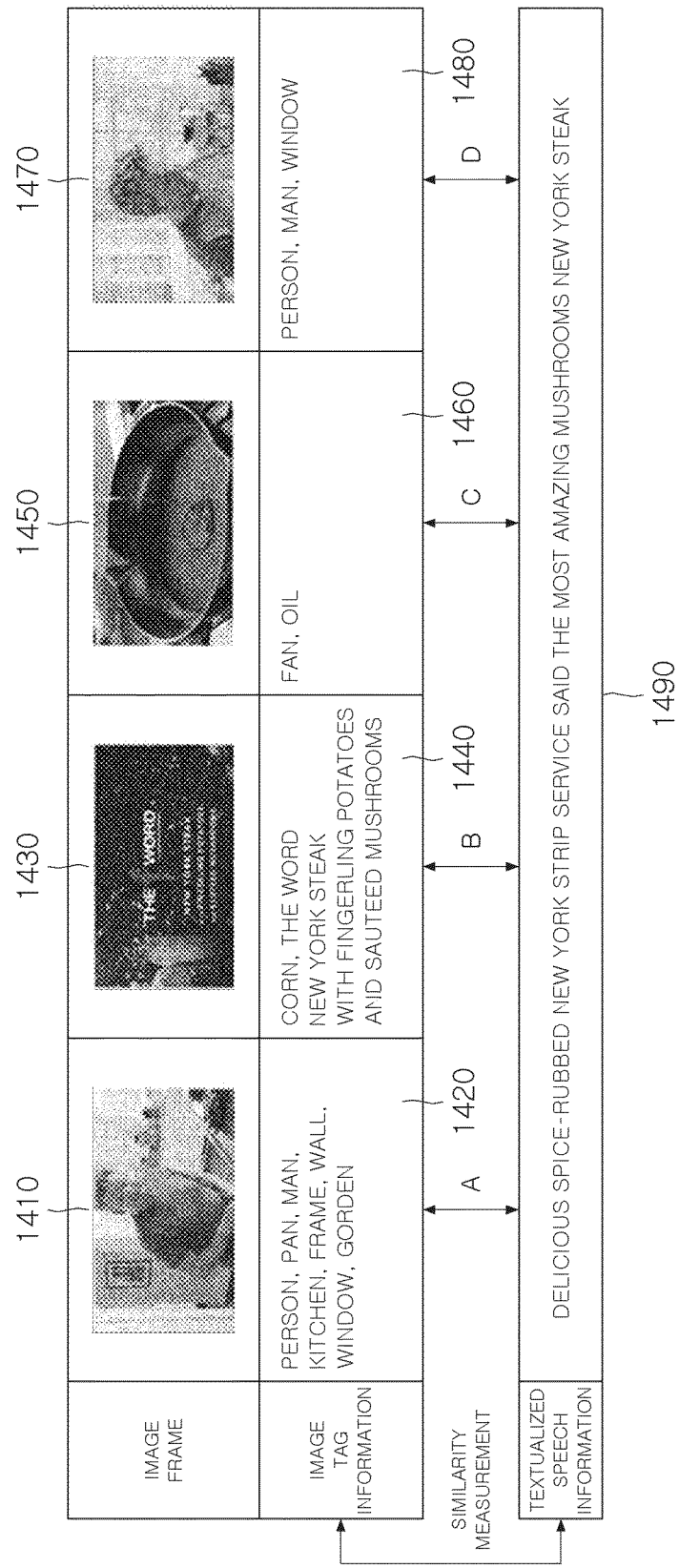
FIG. 14 is a diagram illustrating measurement of a similarity between a plurality of image tag information and textualized speech information.

For example, as illustrated in FIG. 14, the scene selecting unit 437 may measure a similarity A between first image tag information 1420 corresponding to a first image frame 1410 and textualized audio information 1490. Further, the scene selecting unit 437 may measure a similarity B between second image tag information 1440 corresponding to a second image frame 1430 and the textualized audio information 1490. Further, the scene selecting unit 437 may measure a similarity C between third image tag information 1460 corresponding to a third image frame 1450 and the textualized audio information 1490. In addition, the scene selecting unit 437 may measure a similarity D between fourth image tag information 1480 corresponding to a fourth image frame 1470 and the textualized audio information 1490.

As the similarity measurement result, since the similarity B between the second image tag information 1440 and the textualized speech information 1490 is highest, the scene selecting unit 437 may select the second image frame 1430 corresponding to the second image tag information 1440 as the representative image of the corresponding segment.

In the exemplary embodiment, it is exemplified that a similarity comparison target with the image tag information is the textualized speech information, but the present invention is not limited thereto and it will be apparent to those skilled in the art that subtitle text information may be used instead of the textualized speech information.

Figure 15:
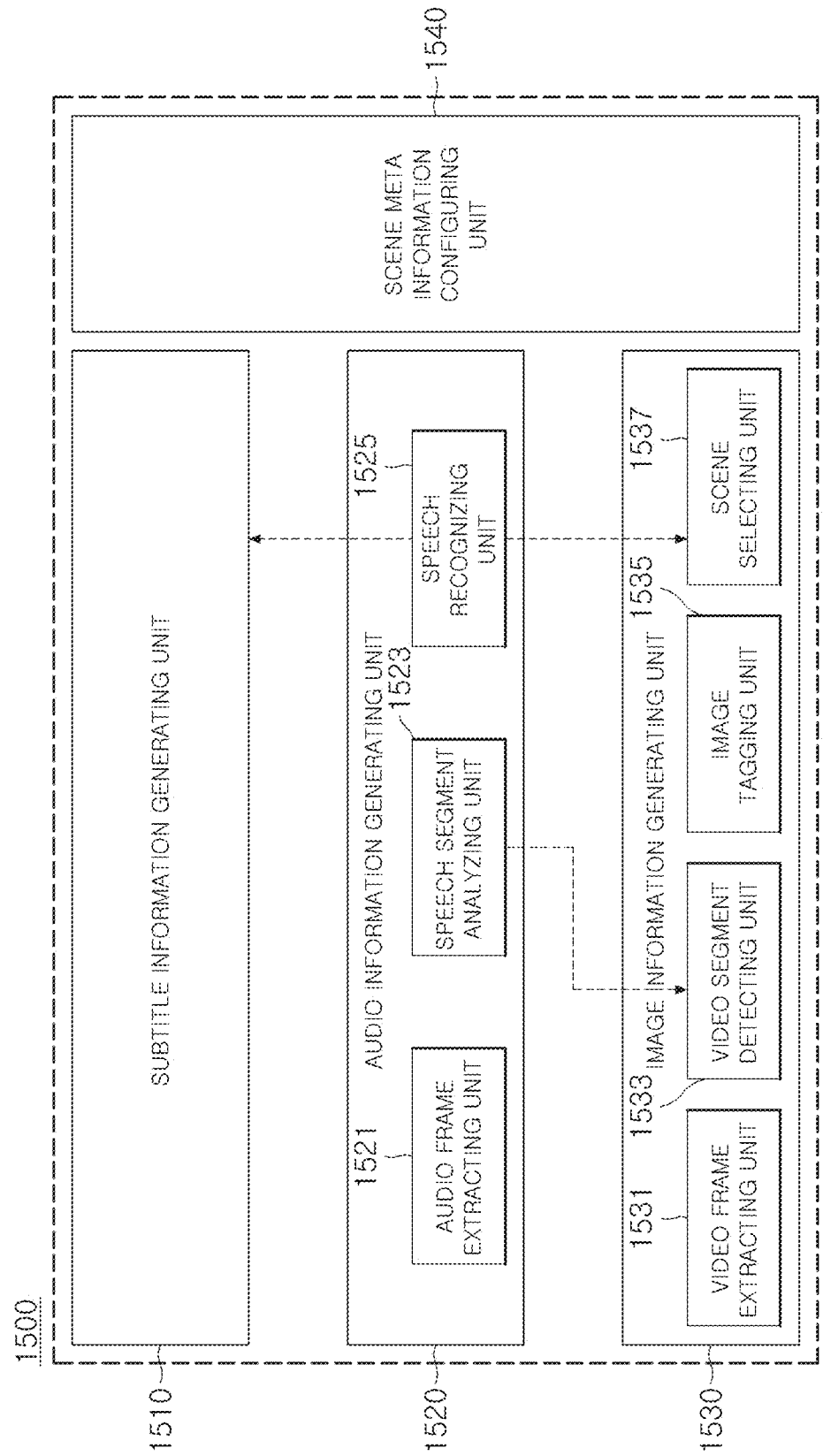
FIG. 15 is a block diagram illustrating a configuration of a scene meta information generating apparatus according to another exemplary embodiment of the present invention.

FIG. 15 is a block diagram illustrating a configuration of a scene meta information generating apparatus according to another exemplary embodiment of the present invention.

Referring to FIG. 15, a scene meta information generating apparatus 1500 according to another exemplary embodiment of the present invention includes a subtitle information generating unit 1510, an audio information generating unit 1520, an image information generating unit 1530, and a scene meta information configuring unit 1540. The components illustrated in FIG. 15 may not all be required in implementing the scene meta information generating apparatus 1500 and the scene meta information generating apparatus described in this specification may thus have components more or less than components listed above.

The scene meta information generating apparatus 1500 according to another embodiment of the present invention may be implemented through the scene meta information generating unit 230 of the server 200 or implemented through the control unit 350 of the user terminal 300. That is, the scene meta information generating apparatus 1500 may be implemented in the server 200 or the user terminal 300. In addition, the scene meta information generating apparatus 1500 may be implemented through separate hardware and/or software regardless of the server 200 and the user terminal 300.

The scene meta information generating apparatus 1500 according to the present invention may generate new subtitle information by performing speech recognition or "speech-recognizing" the audio information extracted from the image contents unlike the scene meta information generating apparatus 400 of FIG. 4. When only the image contents exist (i.e., when a separate subtitle file does not exist), the scene meta information generating apparatus 1500 is particularly useful.

The subtitle information generating unit 1510 according to the present invention may generate new subtitle information based on the textualized speech information received from the speech recognizing unit 1525 and provide the subtitle information to the scene meta information configuring unit 1540.

The operation of the audio information generating unit 1520, the image information generating unit 1530, and the scene meta information configuring unit 1540, except for the subtitle information generating unit 1510, is the same as or similar to the audio information generating unit 420, the image information generating unit 430, and the scene meta information configuring unit 440 illustrated in FIG. 4, so a detailed description thereof will be omitted.

The scene meta information generating apparatus 1500 may be implemented by a processor or multiple processors. Although it is not shown in drawings, the processor may comprise functional units (i.e. means) for performing at least one of S910 to S940 steps of FIG. 9, S1010 to S1070 steps of FIG. 10, S1110 to S1150 steps of FIG. 11 and S1310 to S1350 steps of FIG. 13. For example, the processor may comprise an audio information generating unit for extracting audio information from image contents, detecting a plurality of speech segments based on the audio information, and performing speech-recognition on audio information in each speech segment, a subtitle information generating for generating subtitle information based on a speech recognition result on the audio information in each speech segment, and an image information generating unit for detecting a video segment corresponding to each speech segment, performing image-recognition on image frames in the video segment, and selecting a representative image from the image frames.

Figure 16:
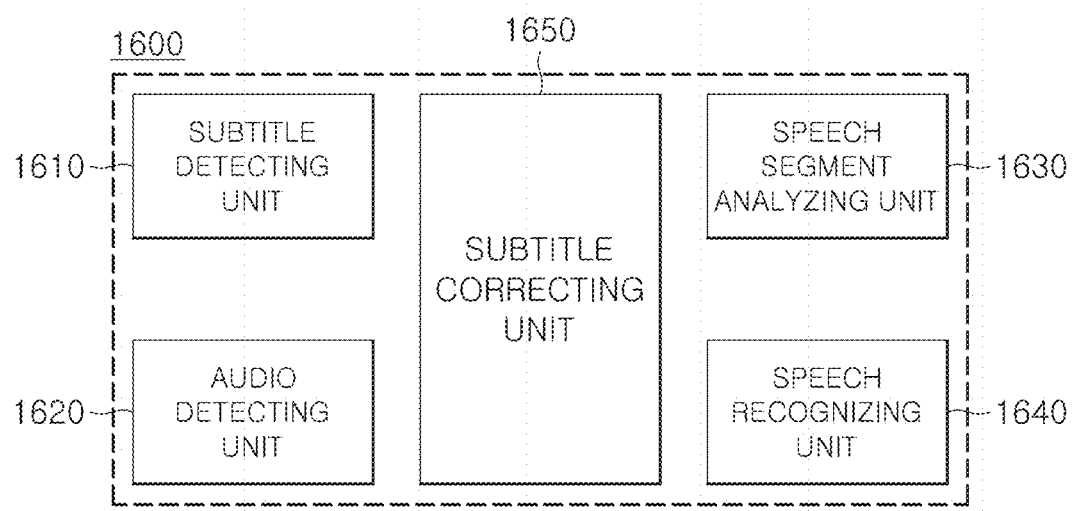
FIG. 16 is a block diagram illustrating a configuration of a subtitle correcting apparatus according to an exemplary embodiment of the present invention.

FIG. 16 is a block diagram illustrating a configuration of a subtitle correcting apparatus according to an exemplary embodiment of the present invention.

Referring to FIG. 16, a subtitle correcting apparatus 1600 according to an exemplary embodiment of the present invention includes a subtitle detecting unit 1610, an audio detecting unit 1620, a speech segment analyzing unit 1630, a speech recognizing unit 1640, and a subtitle correcting unit 1650. All the components illustrated in FIG. 16 may not all be required in implementing the subtitle correcting apparatus 1600 and the subtitle correcting apparatus described in this specification may thus have components more or less than components listed above.

The subtitle correcting apparatus 1600 according to another embodiment of the present invention may be implemented through the control unit 250 of the server 200 or implemented through the control unit 350 of the user terminal 300. That is, the subtitle correcting apparatus 1600 may be implemented in the server 200 or the user terminal 300. In addition, the subtitle correcting apparatus 1600 may be implemented through separate hardware and/or software regardless of the server 200 and the user terminal 300.

The subtitle detecting unit 1610 may extract the subtitle information based on the subtitle file included in the image contents. As another exemplary embodiment, the subtitle detecting unit 1610 may extract the subtitle information based on the subtitle file stored separately from the image contents. Here, the subtitle information may include the subtitle text information and the subtitle segment information.

The subtitle detecting unit 1610 may classify all subtitles of the image contents into the plurality of unit subtitles and detect the subtitle text information of each unit subtitle. Further, the subtitle detecting unit 1610 may detect a subtitle segment in which each unit subtitle is displayed in the playback segment of the image contents.

The audio detecting unit 1620 may extract the audio stream based on the audio file included in the image content and divide the audio stream into a plurality of audio frames suitable for signal processing.

The speech segment analyzing unit 1630 may extract the speech segments of the image contents based on the features of the audio frame. The operation of the speech segment analyzing unit 1630 is the same as or similar to the operation of the speech segment analyzing unit 423 of FIG. 4 described above, so a detailed description thereof will be omitted.

The speech recognizing unit 1640 may speech-recognize the audio information (i.e., speech information) in each speech segment. The operation of the speech recognizing unit 1640 is the same as or similar to the operation of the speech recognizing unit 425 of FIG. 4 described above, so a detailed description thereof will be omitted.

The subtitle correcting unit 1650 may correct the subtitle segment of each unit subtitle according to the speech segments analyzed through the audio information of the image contents. Further, the subtitle correcting unit 1650 may delete a subtitle which exists in the non-speech segment.

The subtitle correcting unit 1650 may correct the text information of each unit subtitle by using the audio information in each speech segment. Further, the subtitle correcting unit 1650 may divide one unit subtitle into two or more unit subtitles by using the audio information in each speech segment. In addition, the subtitle correcting unit 1650 may merge two or more unit subtitles into one unit subtitle by using the audio information in each speech segment.

The subtitle correcting apparatus 1600 may be a processor or multiple processors. Although it is not shown in drawings, the processor may comprise functional units (i.e. means) for performing S1710 to S1760 steps of FIG. 17.

Figure 17:
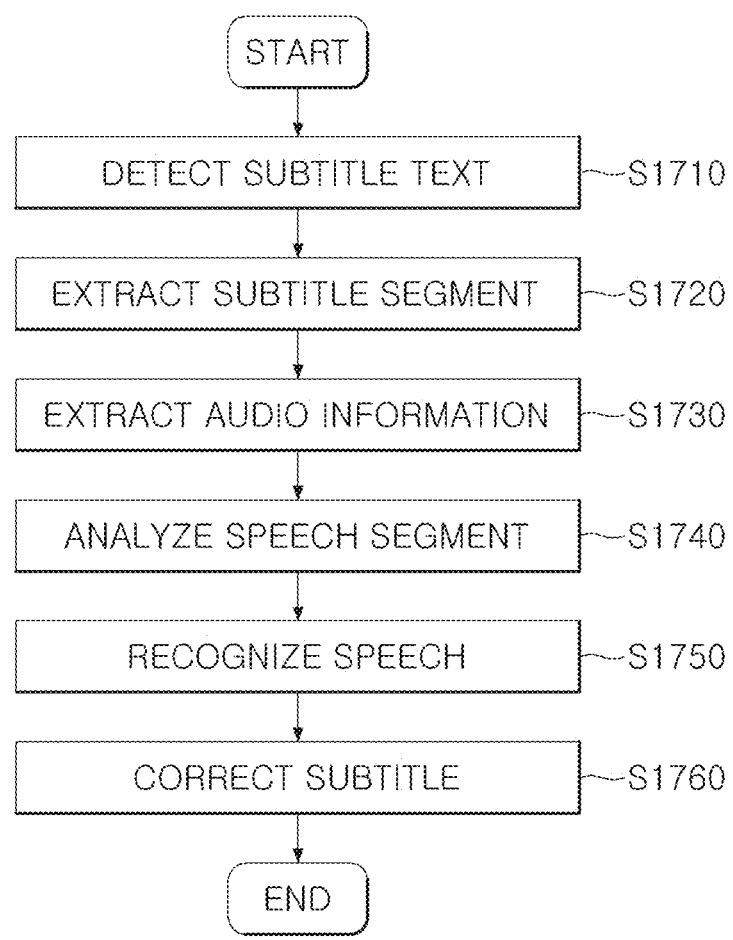
FIG. 17 is a flowchart for describing a subtitle correcting method according to an exemplary embodiment of the present invention.

FIG. 17 is a flowchart for describing a subtitle correcting method according to an exemplary embodiment of the present invention.

Referring to FIG. 17, a subtitle correcting apparatus 1600 according to the present invention may detect the subtitle text information based on the subtitle file included in the image contents or the subtitle file separately stored from the image contents (S1710). In this case, the subtitle correcting apparatus 1600 may classify all subtitles of the image contents into the plurality of unit subtitles and detect the subtitle text information for each unit subtitle.

The subtitle correcting apparatus 1600 may detect the subtitle segment in which each unit subtitle is displayed in the playback segment of the image contents (S1720). Here, the subtitle segment may include subtitle start time information, subtitle end time information, and subtitle display time information.

The subtitle correcting apparatus 1600 may extract the audio stream based on the audio file included in the image contents and divide the audio stream into a plurality of audio frames suitable for signal processing (S1730).

The subtitle correcting apparatus 1600 extracts the features of the audio frame to extract the start time and the end time of each speech segment (S1740). Here, the start time of each speech segment corresponds to the playback time of the image contents at which the speech output starts in the corresponding segment and the end time of each speech segment corresponds to the playback time of the image contents at which the speech output ends in the corresponding segment.

The subtitle correcting apparatus 1600 may generate the textualized speech information by speech-recognizing the audio information (i.e., speech information) in each speech segment.

The subtitle correcting apparatus 1600 may correct the subtitle segment of each unit subtitle according to the speech segments analyzed through the audio information of the image contents. Further, the subtitle correcting unit 1650 may delete an unnecessary subtitle which exists in the non-speech segment.

The subtitle correcting unit 1650 may correct the text information of each unit subtitle by speech-recognizing the audio information in each speech segment. Further, the subtitle correcting unit 1650 may divide one unit subtitle into two or more unit subtitles by speech-recognizing the audio information in each speech segment. Further, the subtitle correcting unit 1650 may merge two or more unit subtitles into one unit subtitle by speech-recognizing the audio information in each speech segment.

As described above, a subtitle correcting method according to the present invention corrects the subtitle segment according to the speech segment to prevent a speech cut-off phenomenon of the speech due to mismatch of the subtitle segment and the speech segment. Further, the subtitle correcting method divides or merges the subtitle according to the speech segment, and as a result, the divided or merged subtitle is improved to a subtitle having a length which the viewer may easily read, thereby enhancing readability of the user.

Figure 18:
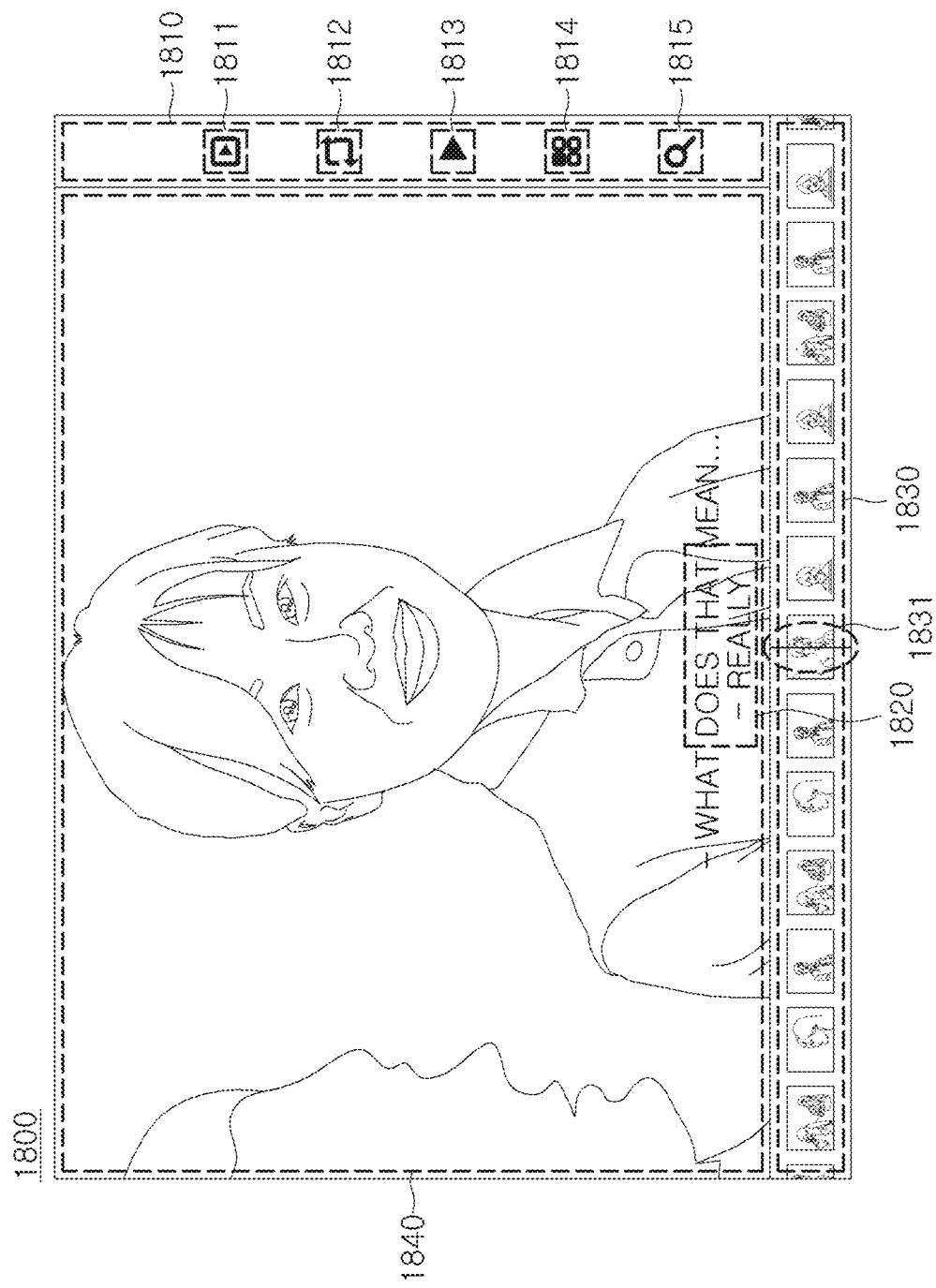
FIG. 18 is a diagram illustrating a user terminal providing a video slide service using scene meta information.

FIG. 18 is a diagram illustrating the user terminal 300 providing a video slide service using scene meta information.

Referring to FIG. 18, the user terminal 300 according to the present invention may provide the moving image playback service based on the image contents and/or the subtitle file. Further, the user terminal 300 may generate page information by using the scene meta information regarding the image contents and provide the video slide service based on the generated page information. The video slide service may be provided as an additional service type of the moving image playback service.

The user terminal 300 may enter a video slide mode according to the control command of the viewer. The user terminal 300 may display a predetermined page screen 1800 on the display unit at the time of entering the video slide mode. In this case, the page screen 1800 may include a function menu region 1810, a subtitle display region 1820, a scroll region 1830, and an image display region 1840 and the present invention is not particularly limited thereto.

The function menu region 1810 may include a plurality of menus for executing functions related to the video slide service. For example, the function menu region 1810 includes a first function menu 1811 for receiving an image switching request from the user, a second function menu 1812 for receiving a playback option control from the user, a playback/stop function menu 1813 for receiving a playback/stop request of audio information output from the page, a third function menu 1814 for receiving a screen dividing request from the user, and a fourth function menu 1815 for receiving a subtitle search or translation request from the user.

The subtitle display region 1820 may include subtitle text information corresponding to the current page. The image display region 1840 may include a representative image corresponding to the current page.

The scroll region 1830 may include a plurality of thumbnail images corresponding to a plurality of pages existing before and after the current page. The plurality of thumbnail images are images in which representative images corresponding to the plurality of pages are reduced to a predetermined size. The plurality of thumbnail images may be sequentially arranged according to a playback order of the image contents.

The thumbnail image of the current page may be positioned at a center portion 1831 of the scroll region 1830. That is, a page which the viewer currently views may be positioned at the center portion 1831 of the scroll region 1830. The viewer selects any one of the thumbnail images positioned in the scroll region 1830 to immediately move to a page corresponding to the corresponding thumbnail image.

The user terminal 300 may shift to a page having a time code of an order close to the current page in response to a page shift request of the viewer and display the shifted page on a display unit. The page shift request may be made by selecting a partial region of the display unit or scrolling one predetermined point to the other point by the user.

The user terminal 300 may reproduce the image contents from a time corresponding to the time code of the current page in response to an image switching request of the viewer. For example, when the first function menu 1811 is selected, the user terminal 300 may reproduce the image contents from a subtitle segment start time (or speech segment start time) of the current page.

In a state in which the image contents are being reproduced, the user terminal 300 may display on the display unit a page corresponding to a current playback time or a playback time earlier than the current playback time in response to the page switching request.

The user terminal 300 may control an output method of the audio information in response to a playback option control request of the viewer. For example, the user terminal 300 may perform any one playback mode of a first playback mode to repeatedly output the audio information of the current page, a second playback mode to stop the output of the audio information after the audio information of the current page is output, and a third playback mode to shift to a next page of the current page after the audio information of the current page is output and display the shifted page in response to the playback option control request.

The user terminal 300 may divide a display screen of the display unit into a predetermined number in response to a screen dividing request of the viewer and display a plurality of pages on the divided screens.

The user terminal 300 may reproduce or stop the audio information output from the current page in response to the playback/stop request of the viewer. Further, the user terminal 300 may search subtitles corresponding to the plurality of pages in response to a subtitle search request of the viewer and display the search result on the display unit.

The user terminal 300 may translate the subtitle corresponding to the current page in response a subtitle translation request of the viewer and display the translation result on the display 210. The user terminal 300 may request translation for the corresponding subtitle to an internal translation program or an external translation program which is interlocked in respect to a translation requested subtitle and provide a translation result to the display unit.

As described above, the user terminal 300 may provide the video slide service to view the moving image by the unit of the page like a book by using the scene meta information for each playback segment for the image contents.

FIG. 19 is a diagram illustrating a user terminal providing a video search service using scene meta information.

Referring to FIG. 19, the user terminal 300 according to the present invention may provide the moving image playback service based on the image contents and/or the subtitle file. Further, the user terminal 300 may provide the video search service using the scene meta information regarding the image contents. The video search service may be provided as an additional service of the moving image playback service.

The user terminal 300 may enter a video search mode according to the control command of the viewer. The user terminal 300 may display a predetermined scene search screen 1900 on the display unit at the time of entering the video search mode.

The scene search screen 1900 may include a search word input region 1910 and a search scene display region 1920. The search word input region 1910 is a region for inputting a search word for describing a screen of image contents which the viewer intends to search and the search scene display region 1920 is a region for displaying a scene matching the search word among scenes included in the image contents.

When a predetermined search word (for example, "What car did hero ride in secret forest?") is input through the search word input region 1910, the user terminal 300 may search the scene meta information matching the input search word among the scene meta information stored in the database.

The user terminal 300 may display the representative image corresponding to the searched scene meta information on a scene search screen 1900. Further, the user terminal 300 may display on the display unit indicators 1921 and 1923 indicating the objects related to the search word in the representative image.

As described above, the user terminal 300 may provide the video search service to rapidly search a desired scene by using the scene meta information for each playback segment for the image contents.

Hereinabove, as described above, according to at least one of the exemplary embodiments of the present invention, the scene meta information for each playback segment is generated by the audio information extracted from the image contents to provide various video services using the scene meta information for each playback segment.

According to at least one of the exemplary embodiments of the present invention, the subtitle segment and/or subtitle text information is corrected by using the audio information extracted from the image contents to enhance the readability of the viewer for the subtitle displayed in one region of the display unit.

However, advantages which can be obtained by the content providing server, the content providing terminal, and the content providing method according to the exemplary embodiments of the present invention are not limited to the aforementioned effects and other unmentioned advantages will be clearly understood by those skilled in the art from the following description.

The aforementioned present invention may be implemented by a computer readable code in a medium having a program recorded therein. The computer readable medium may continuously store or temporarily store a computer executable program for execution or downloading. Further, the medium may be a variety of recording means or storage means in the form of a combination of a single hardware or a plurality of hardware, and is not limited to a medium directly connected to a computer system, but may be dispersed on a network. Examples of the medium may include a magnetic medium such as a hard disk, a floppy disk and a magnetic tape, an optical recording medium such as CD-ROM and DVD, a magneto-optical medium such as a floptical disk, and a medium configured to store a program command, which includes a ROM, a RAM, flash memory, and the like. Further, examples of other media may be recording media or storage media managed by an app store distributing an application or sites, servers, and the like that supply or distribute various other software. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

What is claimed is:

1. A scene meta information generating apparatus comprising:
a processor configured to generate scene meta information based on image contents, said processor including:
an audio information generating unit configured to extract audio information from the image contents, detect a plurality of speech segments based on the audio information, and perform speech-recognition on audio information in each of the plurality of speech segments;
a subtitle information generating unit configured to detect a plurality of unit subtitles based on a subtitle file related to the image contents and correct the plurality of unit subtitles associated with the plurality of speech segments based on the extracted audio information; and
an image information generating unit configured to detect a plurality of video segments corresponding to the plurality of speech segments, perform image-recognition on image frames in each of the plurality of the video segments, and select a representative image from the image frames, based on information related to a result of the speech-recognition and information related to a result of the image-recognition.

2. The scene meta information generating apparatus of claim 1, wherein the subtitle information generating unit includes a subtitle extracting unit for detecting unit subtitles related to the image contents, a subtitle segment detecting unit for detecting a subtitle segment of the unit subtitles, and a subtitle correcting unit for correcting the unit subtitles.

3. The scene meta information generating apparatus of claim 2, wherein the subtitle correcting unit corrects the subtitle segment of the unit subtitles based on speech segments detected through the audio information.

4. The scene meta information generating apparatus of claim 2, wherein the subtitle correcting unit corrects subtitle text information of the unit subtitles based on a speech recognition result on the audio information in each speech segment.

5. The scene meta information generating apparatus of claim 2, wherein the subtitle correcting unit divides one unit subtitle into two or more unit subtitles or merges two or more unit subtitles into one unit subtitle based on the speech recognition result on the audio information in each speech segment.

6. The scene meta information generating apparatus of claim 1, wherein the audio information generating unit includes an audio extracting unit for extracting the audio information from the image contents, a speech segment analyzing unit for detecting the speech segments of the image contents, and a speech recognizing unit for speech-recognizing the audio information in each speech segment.

7. The scene meta information generating apparatus of claim 6, wherein the speech segment analyzing unit divides an audio stream into a plurality of audio frames having a size suitable for signal processing, extracts characteristics of the audio frames and detects a start time and an end time of each speech segment based on the extracted characteristics of the audio frames.

8. The scene meta information generating apparatus of claim 6, wherein the speech recognizing unit detects feature vectors of the audio information corresponding to each speech segment and performs speech recognition through pattern analysis of the feature vectors.

9. The scene meta information generating apparatus of claim 1, wherein the image information generating unit includes an image extracting unit for detecting images constituting the image contents, a video segment detecting unit for detecting a video segment corresponding to each speech segment, an image tagging unit for generating image tag information regarding images in the video segment, and a scene selecting unit for selecting a representative image of the video segment.

10. The scene meta information generating apparatus of claim 9, wherein the image tagging unit generates the image tag information on each of the plurality of images by image-recognizing a plurality of images which exists in each video segment.

11. The scene meta information generating apparatus of claim 9, wherein the scene selecting unit converts textualized speech information corresponding to each speech segment and image tag information corresponding to each video segment into vector information using a predetermined Word Embedding Model.

12. The scene meta information generating apparatus of claim 11, wherein the predetermined Word Embedding Model is a Word2Vec model.

13. The scene meta information generating apparatus of claim 11, wherein the scene selecting unit measures a similarity between first vector information corresponding to the image tag information and second vector information corresponding to the textualized speech information using a predetermined similarity measurement technique.

14. The scene meta information generating apparatus of claim 13, wherein the predetermined similarity measurement technique includes at least one of a cosine similarity measurement technique, a Euclidean similarity measurement technique, a similarity measurement technique using a Jacquard coefficient, a similarity measurement technique using a Pearson correlation coefficient, or a similarity measurement technique using a Manhattan distance.

15. The scene meta information generating apparatus of claim 13, wherein the scene selecting unit selects an image corresponding to image tag information having a highest similarity level in comparison to the textualized speech information among images in each video segment as the representative image of the corresponding segment.

16. The scene meta information generating apparatus of claim 1, the processor further comprising:
a scene meta information configuring unit configured to generate scene meta information based on subtitle information received from the subtitle information generating unit, audio information received from the audio information generating unit, and representative image information received from the image information generating unit.

17. The scene meta information generating apparatus of claim 16, wherein a frame of the scene meta information includes at least one of an ID field for identifying the scene meta information, a time code field for indicating a subtitle segment or a speech segment, a representative image field for indicating the representative image, a speech field for indicating the speech information, a subtitle field for indicating the subtitle information, and an image tag field for indicating image tag information.

18. The scene meta information generating apparatus of claim 16, wherein the scene meta information configuring unit merges two or more scene meta information into one scene meta information when the representative images of the two or more scene meta information are similar to each other.

19. A scene meta information generating method comprising:
extracting audio information from image contents and detecting a plurality of speech segments based on the audio information;
detecting a plurality of unit subtitles based on a subtitle file related to the image contents and correcting the plurality of unit subtitles associated with the plurality of speech segments based on the extracted audio information; and
detecting a plurality of video segments corresponding to the plurality of speech segments, performing image-recognition on image frames in each of the plurality of video segments; and
selecting a representative image from the image frames based on information related to a result of the speech-recognition and information related to a result of the image recognition.

20. A scene meta information generating apparatus comprising:
a processor configured to generate scene meta information based on image contents, said processor including:
an audio information generating unit configured to extract audio information from image contents, detect a plurality of speech segments based on the audio information, and perform speech-recognition on audio information in each of the plurality of speech segments;
a subtitle information generating unit configured to generate a plurality of unit subtitles associated with the plurality of speech segments based on the extracted audio information; and
an image information generating unit configured to detect a plurality of video segments corresponding to the plurality of speech segments, perform image-recognition on image frames in each of the plurality of video segments, and select a representative image from the image frames based on information related to a result of the speech-recognition and information related to a result of the image-recognition.

* * * * *